(12) United States Patent
Attar et al.

(10) Patent No.: US 10,778,584 B2
(45) Date of Patent: Sep. 15, 2020

(54) SYSTEM AND METHOD FOR MULTI-PATH LOAD BALANCING IN NETWORK FABRICS

(71) Applicant: Cisco Technology, Inc., San Jose, CA (US)

(72) Inventors: Mohammadreza Alizadeh Attar, Santa Clara, CA (US); Thomas J. Edsall, Los Gatos, CA (US); Sarang M. Dharmapurikar, Cupertino, CA (US); Janakiramanan Vaidyanathan, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 492 days.

(21) Appl. No.: 14/308,464

(22) Filed: Jun. 18, 2014

(65) Prior Publication Data
US 2015/0127797 A1    May 7, 2015

Related U.S. Application Data

(60) Provisional application No. 61/900,302, filed on Nov. 5, 2013.

(51) Int. Cl.
*H04L 12/803* (2013.01)
*H04L 12/721* (2013.01)

(52) U.S. Cl.
CPC ............ *H04L 47/125* (2013.01); *H04L 45/38* (2013.01)

(58) Field of Classification Search
CPC .............................. H04L 47/125; H04L 45/38
See application file for complete search history.

(56) References Cited

U.S. PATENT DOCUMENTS

| | | | |
|---|---|---|---|
| 4,298,770 A | 11/1981 | Nishihara et al. |
| 4,636,919 A | 1/1987 | Itakura et al. |
| 4,700,016 A | 10/1987 | Hitchcock et al. |
| 5,115,431 A | 5/1992 | Williams et al. |
| 5,859,835 A | 1/1999 | Varma et al. |
| 5,926,458 A | 7/1999 | Yin et al. |
| 6,252,876 B1 | 6/2001 | Brueckheimer et al. |
| 6,389,031 B1 | 5/2002 | Chao et al. |
| 6,456,624 B1 | 9/2002 | Eccles et al. |

(Continued)

FOREIGN PATENT DOCUMENTS

| | | |
|---|---|---|
| WO | WO 2003/067799 | 8/2003 |
| WO | WO 2014/071996 | 5/2014 |

OTHER PUBLICATIONS

Moncaster et al., "The Need for Congestion Exposure in the Internet", Oct. 26, 2009, Internet-Draft.*

(Continued)

*Primary Examiner* — Jason D Recek
*Assistant Examiner* — Lesa M Kennedy
(74) *Attorney, Agent, or Firm* — Polsinelli PC

(57) ABSTRACT

In accordance with one embodiment, a source leaf device receives a packet. The source leaf device identifies a flowlet associated with the packet and a destination leaf device to which the packet is to be transmitted. The source leaf device may determine whether the flowlet is a new flowlet. The source leaf device may select an uplink of the source leaf device via which to transmit the flowlet to the destination leaf device according to whether the flowlet is a new flowlet. The source leaf device may then transmit the packet to the destination leaf device via the uplink.

21 Claims, 12 Drawing Sheets

Receive, by the source leaf device, a packet from the destination leaf device, the packet including information pertaining to the remote congestion metric associated with a specified one of the plurality of uplinks, wherein the specified one of the plurality of uplinks is the selected one of the plurality of uplinks, wherein the remote congestion metric indicates a maximum level of congestion experienced between the selected one of the plurality of uplinks of the source leaf device and the destination leaf device
810

Update, by the source leaf device, the remote congestion metric based, at least in part, upon the information pertaining to the remote congestion metric associated with the specified one of the plurality of uplinks
812

(56) References Cited

U.S. PATENT DOCUMENTS

| | | |
|---|---|---|
| 6,650,640 B1 | 11/2003 | Muller et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,876,952 B1 | 4/2005 | Kappler et al. |
| 6,907,039 B2 | 6/2005 | Shen |
| 6,941,649 B2 | 9/2005 | Goergen |
| 6,952,421 B1 | 10/2005 | Slater |
| 6,954,463 B1 | 10/2005 | Ma et al. |
| 6,996,099 B1 | 2/2006 | Kadambi et al. |
| 7,068,667 B2 | 6/2006 | Foster et al. |
| 7,152,117 B1 | 12/2006 | Stapp et al. |
| 7,177,946 B1 | 2/2007 | Kaluve et al. |
| 7,369,498 B1* | 5/2008 | Ma ............... H04L 47/10 370/235 |
| 7,372,857 B1 | 5/2008 | Kappler et al. |
| 7,411,915 B1 | 8/2008 | Spain et al. |
| 7,426,604 B1 | 9/2008 | Rygh et al. |
| 7,516,211 B1 | 4/2009 | Gourlay et al. |
| 7,539,131 B2 | 5/2009 | Shen |
| 7,580,409 B1 | 8/2009 | Swenson et al. |
| 7,630,368 B2 | 12/2009 | Tripathi et al. |
| 7,729,296 B1 | 6/2010 | Choudhary |
| 7,826,400 B2 | 11/2010 | Sakauchi |
| 7,826,469 B1 | 11/2010 | Li et al. |
| 7,848,340 B2 | 12/2010 | Sakauchi et al. |
| 8,233,384 B2 | 7/2012 | Osterhout et al. |
| 8,302,301 B2 | 11/2012 | Lau |
| 8,325,459 B2 | 12/2012 | Mutnury et al. |
| 8,339,973 B1 | 12/2012 | Pichumani et al. |
| 8,378,223 B1 | 2/2013 | Shiue et al. |
| 8,442,063 B1 | 5/2013 | Zhou et al. |
| 8,514,712 B1 | 8/2013 | Aswadhati |
| 8,687,629 B1 | 4/2014 | Kompella et al. |
| 8,854,972 B1 | 10/2014 | Li |
| 8,868,766 B1 | 10/2014 | Theimer et al. |
| 8,908,691 B2 | 12/2014 | Biswas et al. |
| 9,036,481 B1* | 5/2015 | White ............... H04L 47/11 370/235 |
| 9,106,508 B2 | 8/2015 | Banavalikar et al. |
| 9,178,715 B2 | 11/2015 | Jain et al. |
| 9,197,551 B2 | 11/2015 | DeCusatis et al. |
| 9,203,188 B1 | 12/2015 | Siechen et al. |
| 9,245,626 B2 | 1/2016 | Fingerhut et al. |
| 9,258,195 B1 | 2/2016 | Pendleton et al. |
| 9,325,524 B2 | 4/2016 | Banavalikar et al. |
| 9,374,294 B1 | 6/2016 | Pani |
| 9,402,470 B2 | 8/2016 | Shen et al. |
| 9,407,501 B2 | 8/2016 | Yadav et al. |
| 9,426,060 B2 | 8/2016 | Dixon et al. |
| 9,433,081 B1 | 8/2016 | Xiong et al. |
| 9,444,634 B2 | 9/2016 | Pani |
| 9,502,111 B2 | 11/2016 | Dharmapurikar et al. |
| 9,509,092 B2 | 11/2016 | Shen et al. |
| 9,544,185 B1 | 1/2017 | Yadav et al. |
| 9,544,224 B2 | 1/2017 | Chu et al. |
| 9,590,914 B2 | 3/2017 | Attar et al. |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,667,431 B2 | 5/2017 | Pani |
| 9,667,551 B2 | 5/2017 | Edsall et al. |
| 9,674,086 B2 | 6/2017 | Ma et al. |
| 9,686,180 B2 | 6/2017 | Chu et al. |
| 9,698,994 B2 | 7/2017 | Pani |
| 9,716,665 B2 | 7/2017 | Attar et al. |
| 9,742,673 B2 | 8/2017 | Banerjee et al. |
| 9,755,965 B1 | 9/2017 | Yadav et al. |
| 9,769,078 B2 | 9/2017 | Attar et al. |
| 9,876,715 B2 | 1/2018 | Edsall et al. |
| 2002/0126671 A1 | 9/2002 | Ellis et al. |
| 2002/0136268 A1 | 9/2002 | Gan et al. |
| 2002/0146026 A1 | 10/2002 | Unitt et al. |
| 2003/0035385 A1 | 2/2003 | Walsh et al. |
| 2003/0058837 A1 | 3/2003 | Denney et al. |
| 2003/0058860 A1 | 3/2003 | Kunze et al. |
| 2003/0067912 A1 | 4/2003 | Mead et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0120884 A1 | 6/2003 | Koob et al. |
| 2003/0137940 A1 | 7/2003 | Schwartz et al. |
| 2003/0142629 A1 | 7/2003 | Krishnamurthi et al. |
| 2003/0174650 A1 | 9/2003 | Shankar et al. |
| 2003/0223376 A1 | 12/2003 | Elliott et al. |
| 2003/0231646 A1 | 12/2003 | Chandra et al. |
| 2004/0031030 A1 | 2/2004 | Kidder et al. |
| 2004/0062259 A1 | 4/2004 | Jeffries et al. |
| 2004/0073715 A1 | 4/2004 | Folkes et al. |
| 2004/0100901 A1 | 5/2004 | Bellows |
| 2004/0103310 A1 | 5/2004 | Sobel et al. |
| 2004/0111507 A1 | 6/2004 | Villado et al. |
| 2004/0160956 A1 | 8/2004 | Hardy et al. |
| 2004/0249960 A1 | 12/2004 | Hardy et al. |
| 2005/0007961 A1 | 1/2005 | Scott et al. |
| 2005/0010685 A1 | 1/2005 | Ramnath et al. |
| 2005/0013280 A1 | 1/2005 | Buddhikot et al. |
| 2005/0073958 A1 | 4/2005 | Atlas et al. |
| 2005/0083835 A1 | 4/2005 | Prairie et al. |
| 2005/0091239 A1 | 4/2005 | Ward et al. |
| 2005/0117593 A1 | 6/2005 | Shand |
| 2005/0175020 A1 | 8/2005 | Park et al. |
| 2005/0201375 A1 | 9/2005 | Komatsu et al. |
| 2005/0207410 A1 | 9/2005 | Adhikari et al. |
| 2005/0213504 A1 | 9/2005 | Enomoto et al. |
| 2005/0232227 A1 | 10/2005 | Jorgenson et al. |
| 2005/0240745 A1 | 10/2005 | Iyer et al. |
| 2006/0013143 A1 | 1/2006 | Yasuie et al. |
| 2006/0028285 A1 | 2/2006 | Jang et al. |
| 2006/0031643 A1 | 2/2006 | Figueira |
| 2006/0039364 A1 | 2/2006 | Wright |
| 2006/0072461 A1 | 4/2006 | Luong et al. |
| 2006/0075093 A1 | 4/2006 | Frattura et al. |
| 2006/0083179 A1 | 4/2006 | Mitchell |
| 2006/0083256 A1 | 4/2006 | Mitchell |
| 2006/0176810 A1* | 8/2006 | Kekki ............... H04L 47/10 370/229 |
| 2006/0182036 A1 | 8/2006 | Sasagawa et al. |
| 2006/0193332 A1 | 8/2006 | Qian et al. |
| 2006/0198315 A1 | 9/2006 | Sasagawa et al. |
| 2006/0209688 A1 | 9/2006 | Tsuge et al. |
| 2006/0209702 A1 | 9/2006 | Schmitt et al. |
| 2006/0215572 A1 | 9/2006 | Padhye et al. |
| 2006/0215623 A1 | 9/2006 | Lin et al. |
| 2006/0221835 A1 | 10/2006 | Sweeney |
| 2006/0221950 A1 | 10/2006 | Heer |
| 2006/0227790 A1 | 10/2006 | Yeung et al. |
| 2006/0239204 A1 | 10/2006 | Bordonaro et al. |
| 2006/0250982 A1 | 11/2006 | Yuan et al. |
| 2006/0268742 A1 | 11/2006 | Chu et al. |
| 2006/0274647 A1 | 12/2006 | Wang et al. |
| 2006/0274657 A1 | 12/2006 | Olgaard et al. |
| 2006/0280179 A1 | 12/2006 | Meier |
| 2006/0285500 A1 | 12/2006 | Booth, III et al. |
| 2007/0016590 A1 | 1/2007 | Appleby et al. |
| 2007/0025241 A1 | 2/2007 | Nadeau et al. |
| 2007/0047463 A1 | 3/2007 | Jarvis et al. |
| 2007/0053303 A1 | 3/2007 | Kryuchkov |
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0159987 A1 | 7/2007 | Khan et al. |
| 2007/0160073 A1 | 7/2007 | Toumura et al. |
| 2007/0165515 A1 | 7/2007 | Vasseur |
| 2007/0171814 A1 | 7/2007 | Florit et al. |
| 2007/0177525 A1 | 8/2007 | Wijnands et al. |
| 2007/0183337 A1 | 8/2007 | Cashman et al. |
| 2007/0211625 A1 | 9/2007 | Liu et al. |

(56) References Cited

U.S. PATENT DOCUMENTS

| | | |
|---|---|---|
| 2007/0217415 A1 | 9/2007 | Wijnands et al. |
| 2007/0223372 A1 | 9/2007 | Haalen et al. |
| 2007/0233847 A1 | 10/2007 | Aldereguia et al. |
| 2007/0258382 A1 | 11/2007 | Foll et al. |
| 2007/0258383 A1 | 11/2007 | Wada |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0123559 A1 | 5/2008 | Haviv et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0212496 A1 | 9/2008 | Zou |
| 2008/0219173 A1 | 9/2008 | Yoshida et al. |
| 2008/0225853 A1 | 9/2008 | Melman et al. |
| 2008/0240115 A1* | 10/2008 | Briscoe ............... H04L 12/14 370/400 |
| 2008/0259809 A1 | 10/2008 | Stephan et al. |
| 2008/0259925 A1 | 10/2008 | Droms et al. |
| 2008/0310421 A1 | 12/2008 | Teisberg et al. |
| 2009/0052332 A1 | 2/2009 | Fukuyama et al. |
| 2009/0067322 A1 | 3/2009 | Shand et al. |
| 2009/0094357 A1 | 4/2009 | Keohane et al. |
| 2009/0103566 A1 | 4/2009 | Kloth et al. |
| 2009/0116402 A1 | 5/2009 | Yamasaki |
| 2009/0122805 A1 | 5/2009 | Epps et al. |
| 2009/0161567 A1 | 6/2009 | Jayawardena et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0238196 A1 | 9/2009 | Ukita et al. |
| 2009/0268614 A1 | 10/2009 | Tay et al. |
| 2009/0271508 A1 | 10/2009 | Sommers et al. |
| 2010/0020719 A1 | 1/2010 | Chu et al. |
| 2010/0020726 A1 | 1/2010 | Chu et al. |
| 2010/0128619 A1 | 5/2010 | Shigei |
| 2010/0150155 A1 | 6/2010 | Napierala |
| 2010/0161787 A1 | 6/2010 | Jones |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0287227 A1 | 11/2010 | Goel et al. |
| 2010/0299553 A1 | 11/2010 | Cen |
| 2010/0312875 A1 | 12/2010 | Wilerson et al. |
| 2011/0022725 A1 | 1/2011 | Farkas |
| 2011/0110241 A1 | 5/2011 | Atkinson et al. |
| 2011/0110587 A1 | 5/2011 | Banner |
| 2011/0138310 A1 | 6/2011 | Gomez et al. |
| 2011/0158248 A1 | 6/2011 | Vorunganti et al. |
| 2011/0170426 A1 | 7/2011 | Kompella et al. |
| 2011/0199891 A1 | 8/2011 | Chen |
| 2011/0199941 A1 | 8/2011 | Ouellette et al. |
| 2011/0203834 A1 | 8/2011 | Yoneya et al. |
| 2011/0228795 A1 | 9/2011 | Agrawal et al. |
| 2011/0239189 A1 | 9/2011 | Attalla |
| 2011/0243136 A1 | 10/2011 | Raman et al. |
| 2011/0249682 A1 | 10/2011 | Kean et al. |
| 2011/0268118 A1 | 11/2011 | Schlansker et al. |
| 2011/0273987 A1 | 11/2011 | Schlansker et al. |
| 2011/0280572 A1 | 11/2011 | Vobbilisetty et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0030150 A1 | 2/2012 | McAuley et al. |
| 2012/0030666 A1 | 2/2012 | Laicher et al. |
| 2012/0057505 A1 | 3/2012 | Xue |
| 2012/0063318 A1 | 3/2012 | Boddu et al. |
| 2012/0102114 A1 | 4/2012 | Dunn et al. |
| 2012/0147752 A1* | 6/2012 | Ashwood-Smith ............ H04L 47/122 370/237 |
| 2012/0163396 A1 | 6/2012 | Cheng et al. |
| 2012/0167013 A1 | 6/2012 | Kaiser et al. |
| 2012/0195233 A1 | 8/2012 | Wang et al. |
| 2012/0275304 A1 | 11/2012 | Patel et al. |
| 2012/0281697 A1 | 11/2012 | Huang |
| 2012/0300669 A1 | 11/2012 | Zahavi |
| 2012/0300787 A1 | 11/2012 | Korger |
| 2012/0314581 A1 | 12/2012 | Rajamanickam et al. |
| 2013/0055155 A1 | 2/2013 | Wong et al. |
| 2013/0064246 A1 | 3/2013 | Dharmapurikar et al. |
| 2013/0090014 A1 | 4/2013 | Champion |
| 2013/0097335 A1 | 4/2013 | Jiang et al. |
| 2013/0124708 A1 | 5/2013 | Lee et al. |
| 2013/0151681 A1 | 6/2013 | Dournov et al. |
| 2013/0182712 A1 | 7/2013 | Aguayo et al. |
| 2013/0208624 A1 | 8/2013 | Ashwood-Smith |
| 2013/0223276 A1 | 8/2013 | Padgett |
| 2013/0227108 A1 | 8/2013 | Dunbar et al. |
| 2013/0227689 A1 | 8/2013 | Pietrowicz et al. |
| 2013/0250779 A1 | 9/2013 | Meloche et al. |
| 2013/0250951 A1 | 9/2013 | Koganti |
| 2013/0276129 A1 | 10/2013 | Nelson et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0006549 A1 | 1/2014 | Narayanaswamy et al. |
| 2014/0016501 A1 | 1/2014 | Kamath et al. |
| 2014/0043535 A1 | 2/2014 | Motoyama et al. |
| 2014/0043972 A1 | 2/2014 | Li et al. |
| 2014/0047264 A1 | 2/2014 | Wang et al. |
| 2014/0050223 A1 | 2/2014 | Foo et al. |
| 2014/0056298 A1 | 2/2014 | Vobbilisetty et al. |
| 2014/0064281 A1 | 3/2014 | Basso et al. |
| 2014/0068750 A1 | 3/2014 | Tjahjono et al. |
| 2014/0086097 A1 | 3/2014 | Qu et al. |
| 2014/0086253 A1 | 3/2014 | Yong et al. |
| 2014/0086489 A1 | 4/2014 | Glines et al. |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0108489 A1 | 4/2014 | Glines et al. |
| 2014/0146817 A1 | 5/2014 | Zhang |
| 2014/0146824 A1 | 5/2014 | Angst et al. |
| 2014/0149819 A1 | 5/2014 | Lu et al. |
| 2014/0185348 A1 | 7/2014 | Vattikonda et al. |
| 2014/0185349 A1 | 7/2014 | Terzioglu et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269705 A1 | 9/2014 | DeCusatis et al. |
| 2014/0269712 A1 | 9/2014 | Kidambi |
| 2014/0307744 A1 | 10/2014 | Dunbar et al. |
| 2014/0321277 A1 | 10/2014 | Lynn, Jr. et al. |
| 2014/0328206 A1 | 11/2014 | Chan et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0010001 A1 | 1/2015 | Duda et al. |
| 2015/0016277 A1 | 1/2015 | Smith et al. |
| 2015/0052298 A1 | 2/2015 | Brand et al. |
| 2015/0092551 A1 | 4/2015 | Moisand et al. |
| 2015/0092593 A1 | 4/2015 | Kompella |
| 2015/0113143 A1 | 4/2015 | Stuart et al. |
| 2015/0124629 A1 | 5/2015 | Pani |
| 2015/0124631 A1 | 5/2015 | Edsall et al. |
| 2015/0124633 A1 | 5/2015 | Banerjee et al. |
| 2015/0124640 A1 | 5/2015 | Chu et al. |
| 2015/0124644 A1 | 5/2015 | Pani |

(56) References Cited

U.S. PATENT DOCUMENTS

| | | | |
|---|---|---|---|
| 2015/0124806 A1 | 5/2015 | Banerjee et al. | |
| 2015/0124817 A1 | 5/2015 | Merchant et al. | |
| 2015/0124821 A1 | 5/2015 | Chu et al. | |
| 2015/0124823 A1 | 5/2015 | Pani et al. | |
| 2015/0124824 A1 | 5/2015 | Edsall et al. | |
| 2015/0124825 A1 | 5/2015 | Dharmapurikar et al. | |
| 2015/0124833 A1 | 5/2015 | Ma et al. | |
| 2015/0188771 A1 | 7/2015 | Allan et al. | |
| 2015/0236900 A1 | 8/2015 | Chung | |
| 2015/0256448 A1* | 9/2015 | Xiao | H04L 45/26 370/235 |
| 2015/0378712 A1 | 12/2015 | Cameron et al. | |
| 2015/0378969 A1 | 12/2015 | Powell et al. | |
| 2016/0036697 A1 | 2/2016 | DeCusatis et al. | |
| 2016/0119204 A1 | 4/2016 | Murasato et al. | |
| 2016/0315811 A1 | 10/2016 | Yadav et al. | |
| 2017/0085469 A1 | 3/2017 | Chu et al. | |
| 2017/0207961 A1 | 7/2017 | Saxena et al. | |
| 2017/0214619 A1 | 7/2017 | Chu et al. | |
| 2017/0237651 A1 | 8/2017 | Pani | |
| 2017/0237678 A1 | 8/2017 | Ma et al. | |
| 2017/0250912 A1 | 8/2017 | Chu et al. | |
| 2017/0346748 A1 | 11/2017 | Attar et al. | |

OTHER PUBLICATIONS

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

Chandy, K. Mani, et al., "Distribution Snapshots: Determining Global States of Distributed Systems," ACM Transaction on Computer Systems, Feb. 1985, vol. 3, No. 1, pp. 63-75.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf.org/html/draft-mahalingam-duti-dcops-vxlan-06, Oct. 2013, pp. 1-24.

Narten, T., et al., "Problem Statement: Overlays for Network Virtualization," draft-ietf-nvo3-overlay-problem-statement-04, Internet Engineering Task Force, Jul. 31, 2013, pp. 1-24.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004, 6 pages.

Author Unknown, "Subset—Wikipedia, the free encyclopedia," Dec. 25, 2014, pp. 1-3.

Whitaker et al., "Forwarding Without Loops in Icarus," IEEE OPENARCH 2002, pp. 63-75.

Zhang, Junjie, et al., "Optimizing Network Performance using Weighted Multipath Routing," Aug. 27, 2012, 7 pages.

* cited by examiner

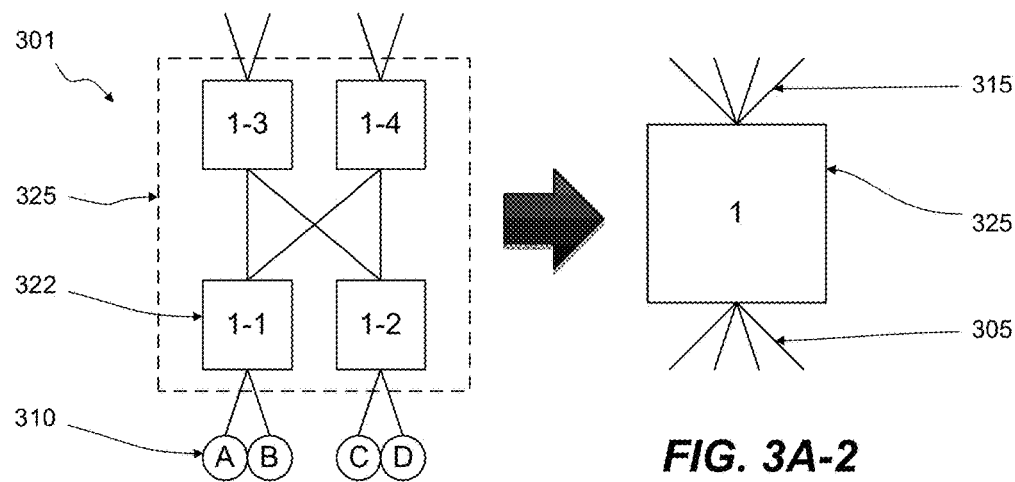
FIG. 3A-1
FIG. 3A-2
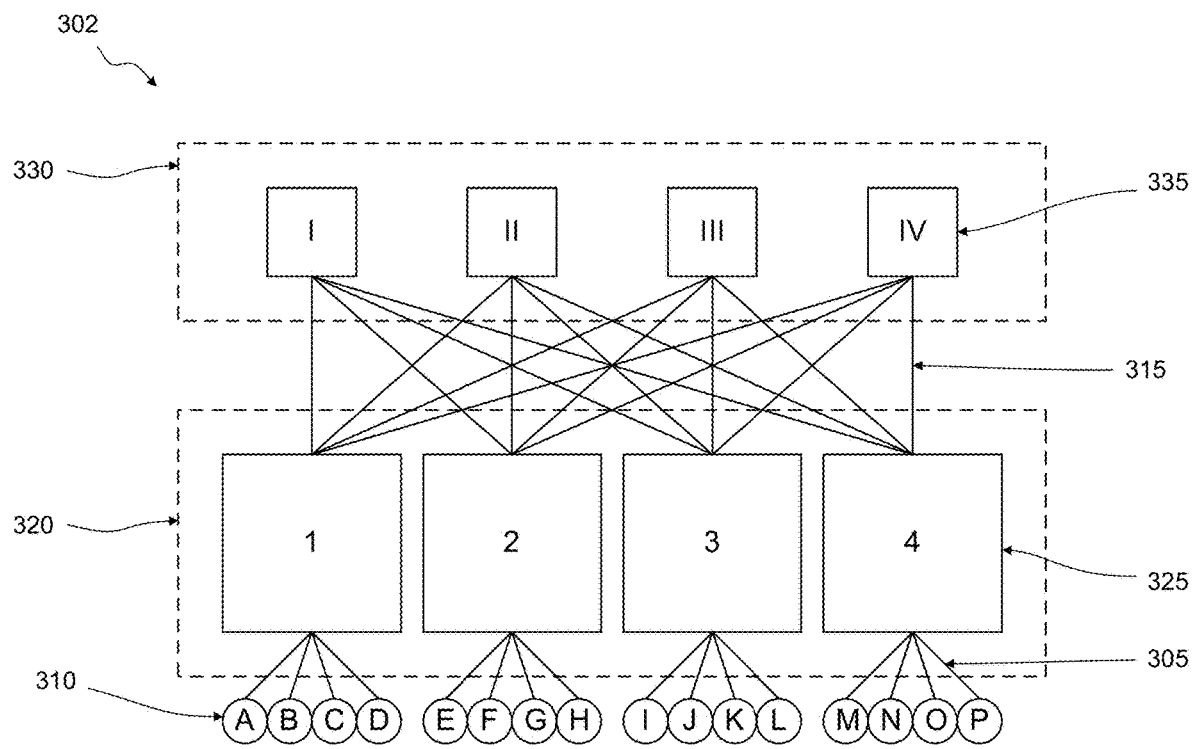
FIG. 3B

Ingress Congestion State Table

|  | Port 0 | Port 1 | Port 2 | Port 3 | Port 4 | Port 5 | Port 6 | Port 7 | Port 8 | Port 9 | Port 10 | Port 11 |
|---|---|---|---|---|---|---|---|---|---|---|---|---|
| Destination TEP A |  |  |  |  |  |  |  |  |  |  |  |  |
| Destination TEP B | 9 | 5 | 3 | 1 | 1 | 2 | 9 | 6 | 4 | 4 | 8 | 7 |
| Destination TEP C |  |  |  |  |  |  |  |  |  |  |  |  |
| Destination TEP D |  |  |  |  |  |  |  |  |  |  |  |  |

FIG. 6A

Egress Congestion State Table

|  | Port 0 | Port 1 | Port 2 | Port 3 | Port 4 | Port 5 | Port 6 | Port 7 | Port 8 | Port 9 | Port 10 | Port 11 |
|---|---|---|---|---|---|---|---|---|---|---|---|---|
| Source TEP A |  |  |  |  |  |  |  |  |  |  |  |  |
| Source TEP B |  |  |  |  |  |  |  |  |  |  |  |  |
| Source TEP C | 3 | 8 | 8 | 2 | 1 | 5 | 7 | 5 | 4 | 6 | 2 | 2 |
| Source TEP D |  |  |  |  |  |  |  |  |  |  |  |  |

FIG. 6B

Flowlet Table

| Flowlet Identifier | Selected Port |
|---|---|
|  |  |
|  |  |
|  |  |
|  |  |

FIG. 6C

Egress Congestion State Table

|  | Port 0 | Port 1 | Port 2 | Port 3 | Port 4 | Port 5 | Port 6 | Port 7 | Port 8 | Port 9 | Port 10 | Port 11 |
|---|---|---|---|---|---|---|---|---|---|---|---|---|
| SourceTEP A |  |  |  |  |  |  |  |  |  |  |  |  |
| Source TEP B | 9 | 5 | 3 | 1 | 1 | 2 | 9 | 6 | 4 | 4 | 8 | 7 |
| Source TEP C |  |  |  |  |  |  |  |  |  |  |  |  |
| Source TEP D |  |  |  |  |  |  |  |  |  |  |  |  |

FIG. 6D

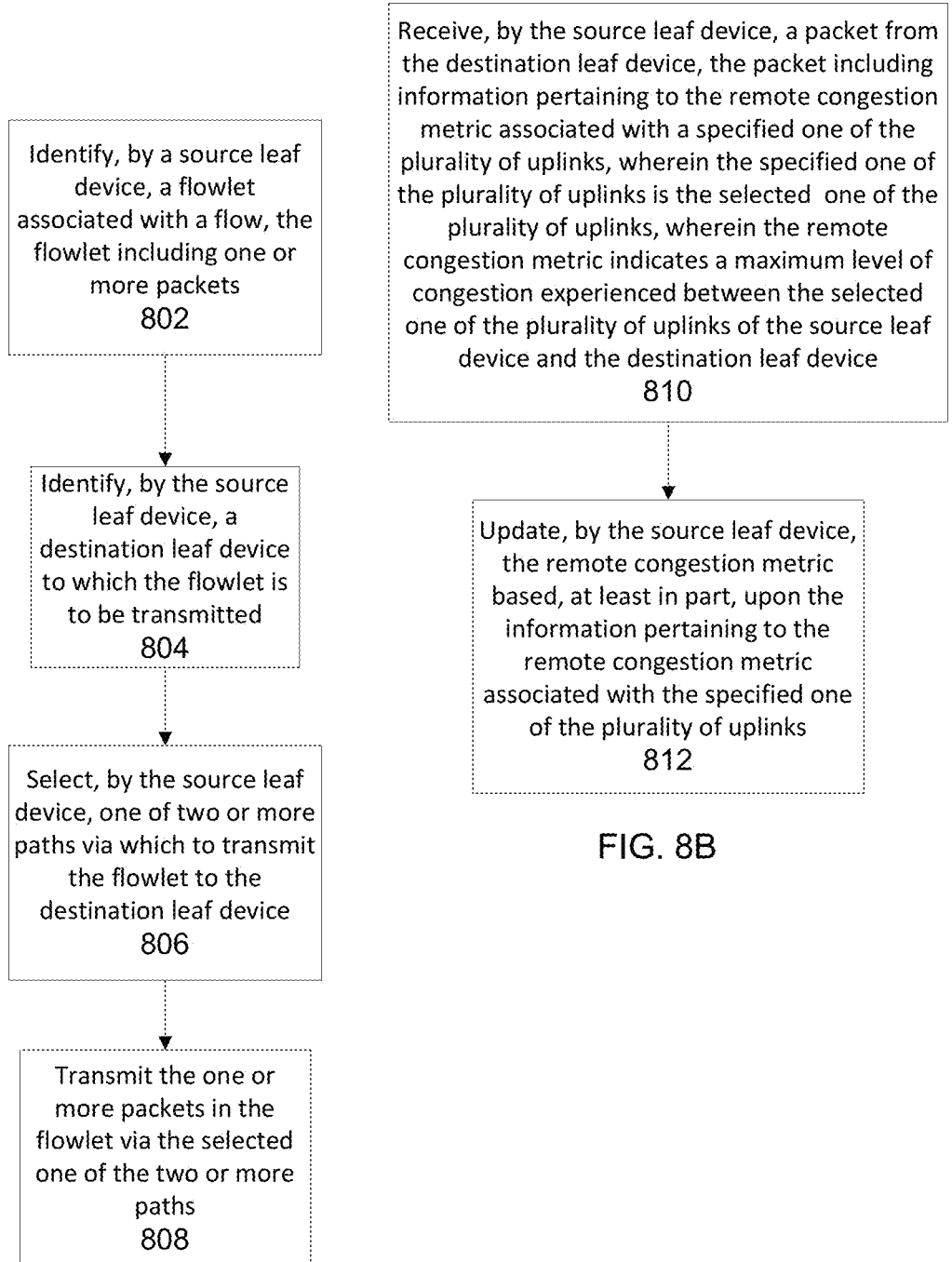

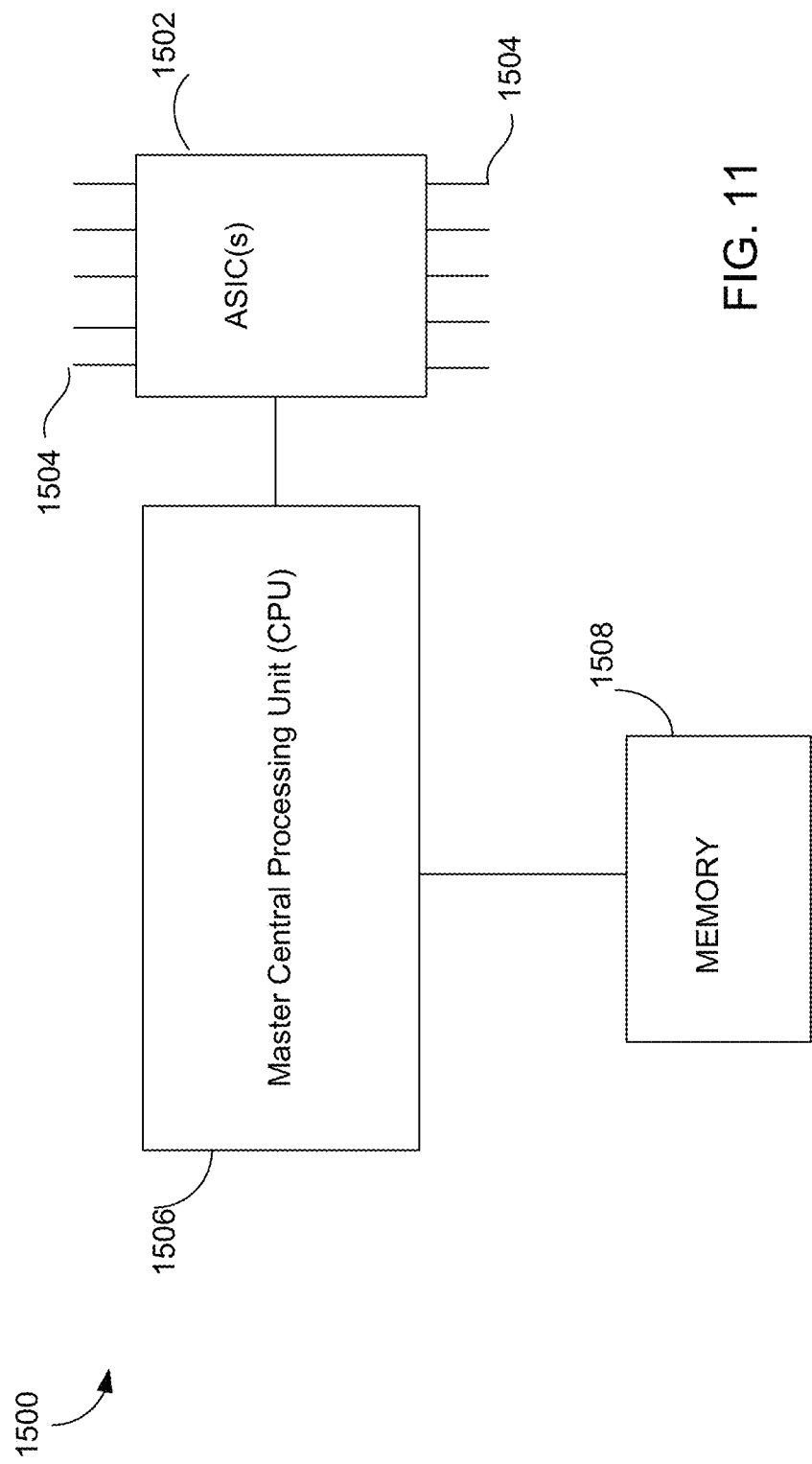

SYSTEM AND METHOD FOR MULTI-PATH LOAD BALANCING IN NETWORK FABRICS

RELATED APPLICATIONS

This application claims priority from U.S. Provisional Application No. 61/900,302, entitled "Fabric Load Balancer," by Attar et al, filed on Nov. 5, 2013, which is incorporated herein by reference in its entirety and for all purposes.

BACKGROUND

1. Technical Field

The present disclosure relates generally to the load balancing of traffic in a network.

2. Description of the Related Art

In packet switching networks, the terms "traffic flow," "packet flow," "network flow," and "flow" may be used interchangeably. The term "flow" may refer to a sequence of packets sent from a source device to a destination, which may be a destination device, a multicast group, or a broadcast domain. RFC 3697, "IPv6 Flow Label Specification," J. Rajahalme, A. Conta, B. Carpenter, and S. Deering, March 2004, defines a flow as "a sequence of packets sent from a particular source to a particular unicast, anycast, or multicast destination that the source desires to label as a flow. A flow could consist of all packets in a specific transport connection or a media stream. However, a flow is not necessarily 1:1 mapped to a transport connection."

RFC 3917, "Requirements for IP Flow Information Export (IPFIX)," J. Quittek, T. Zseby, B. Claise, and S. Zander, October 2004, provides that "[a]ll packets belonging to a particular flow have a set of common properties." Often, such properties are defined by the value of one or more packet header fields, such as a source IP address field, destination IP address field, transport header field (e.g., source port number and/or destination port number), or application header field (e.g., Real-time Transport Protocol (RTP) header fields). The properties of a flow may also include one or more characteristics of the packet itself (e.g., number of MPLS labels) and/or values of one or more fields derived from packet treatment (e.g., next hop IP address, output interface, etc.) A packet is identified as belonging to a flow if it completely satisfies all the defined properties of the flow.

When a network device such as a switch or router receives a packet, the network device transmits the packet to a destination to which the packet is addressed. Often, the network device will have two or more possible paths via which the network device may transmit the packet. However, since the path selection is typically based upon packet header information identifying a flow, all packets associated with a given flow will be transmitted via the same path.

BRIEF DESCRIPTION OF THE DRAWINGS

FIGS. 3A-1, 3A-2, and 3B together illustrate an example 3-tier leaf-spine network in which various embodiments may be implemented.

FIGS. 6A-6C are diagrams illustrating example tables that may be maintained by each leaf device in accordance with various embodiments.

FIG. 6D is a diagram illustrating an example egress table that may be maintained by a destination leaf device for packets received from a source leaf device maintaining the ingress table shown in FIG. 6A

FIG. 8A is a process flow diagram illustrating an example method of processing a new flowlet being transmitted by a leaf device acting as a source leaf device in accordance with various embodiments.

FIG. 8B is a process flow diagram illustrating an example method of processing a reverse packet received by the leaf device of FIG. 8A in accordance with various embodiments.

FIG. 11 is a diagrammatic representation of an example network device in which various embodiments may be implemented.

DESCRIPTION OF EXAMPLE EMBODIMENTS

Figure 1:
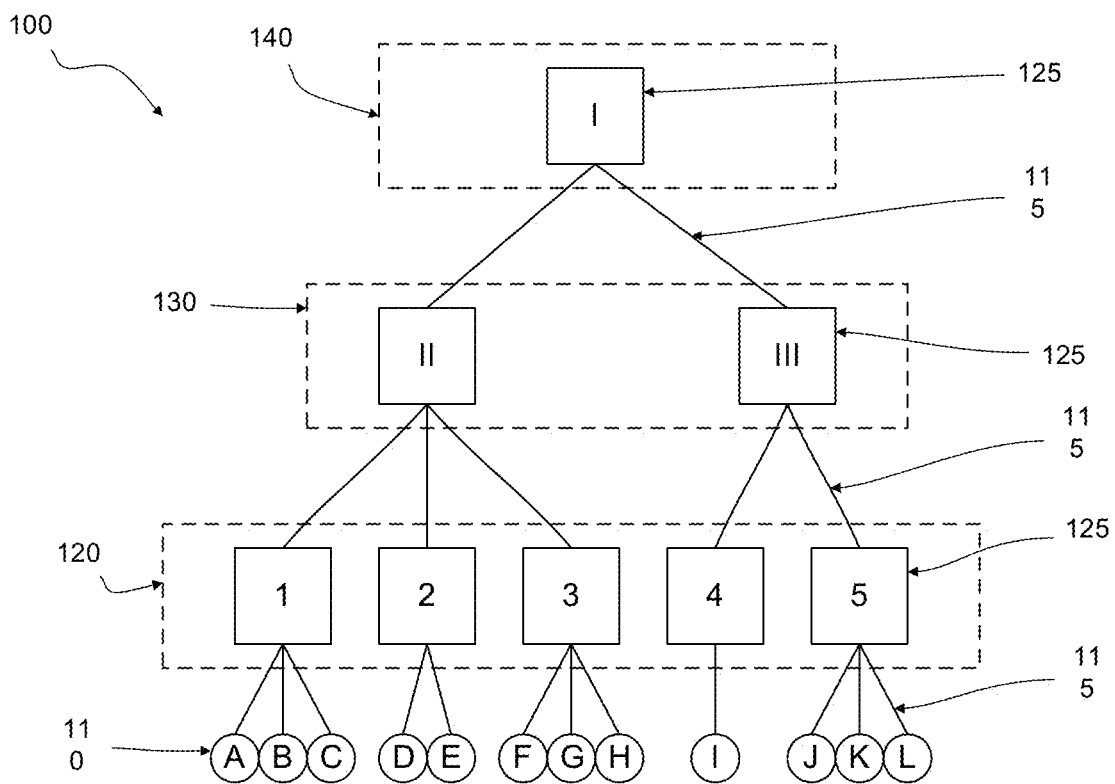
FIG. 1 is a diagrammatic representation of an example access-aggregation-core (AAC) network in which various embodiments may be implemented.

In the following description, numerous specific details are set forth in order to provide a thorough understanding of the disclosed embodiments. It will be apparent, however, to one skilled in the art, that the disclosed embodiments may be practiced without some or all of these specific details. In other instances, well-known process steps have not been described in detail in order to simplify the description.

Overview

In accordance with one embodiment, a source leaf device receives a packet. The source leaf device identifies a flowlet associated with the packet and a destination leaf device to which the packet is to be transmitted. The source leaf device may determine whether the flowlet is a new flowlet. The source leaf device may select an uplink of the source leaf device via which to transmit the flowlet to the destination leaf device according to whether the flowlet is a new flowlet. The source leaf device may then transmit the packet to the destination leaf device via the uplink.

Specific Example Embodiments

When a network device such as router or switch receives a packet, the network device will select one of two or more possible paths via which to transmit the packet. Typically, the network device will select a path (e.g., a link) via which to transmit the packet using a mechanism such as Equal Cost Multi-Pathing (ECMP). When a network device uses ECMP, the network device generates a hash from information in a header of the packet to select one of the possible paths. Since the decision is based entirely upon the hash that is generated, the decision is randomized so that none of the paths is favored. However, since the information upon which the hash is generated identifies the flow, all packets associated with a given flow will be transmitted via the same path.

Since ECMP results in the randomized selection of a path, it is possible for any path to be selected more than other paths. Even if the paths were selected approximately equally, the use of ECMP may also result in longer flows being sent along the same path. In such instances, a given path could experience a bottleneck, resulting in a reduction in the quality of the user experience.

In addition, ECMP generally assumes that a network is symmetric. However, in the event of a failure of a link, the network topology would no longer be symmetric. Unfortunately, existing systems do not account for asymmetry that often occurs in networks.

The disclosed embodiments enable load balancing to be performed in a network during the path selection process. The term path may refer to a transmission channel between two nodes of a network that a packet follows. More particularly, the path may include one or more intermediary network devices such as routers or switches that forward packets along the path. There may be any number of intermediary network devices in a particular path, which can cause delays and reordering of packets.

Packet reordering can cause the Transmission Control Protocol (TCP) to assume a packet was dropped in the network and reduce the transmission rate, hence, significantly lowering throughput and increasing the Average Flow Completion Time (AFCT). In order to minimize the likelihood of packet reordering, all packets within a particular flow are typically forwarded by the network device along a single path. For example, the network device may apply a hash function to information defining the flow (e.g., source address and destination address) to pick a particular path. Unfortunately, sending all packets within a flow via the same path may have a negative impact on network performance.

Each packet may be associated with a particular flow, which is uniquely defined by a set of common properties, which may include the value of one or more packet header fields. For example, each flow may be uniquely identified by a source Internet Protocol (IP) address, a destination IP address, a source port, a destination port, and/or a protocol. The combination of these 5 fields is often referred to as a 5-tuple. These flows may be propagated through a network a via network devices such as routers and/or switches.

Commonly, packets of a flow are transmitted and received in "bursts," i.e., groups of closely spaced and contiguously issued packets. The existence of a time delay between the receipt of one packet and the receipt of a subsequent packet that is greater than or equal to a pre-defined time, t, may be used to delineate one burst of packets from another burst of packets. The time delay may be ascertained by comparing a time stamp from one packet with the time stamp from a subsequently received packet. The number of packets in different bursts of packets may vary from one another. Each burst may include one or more packets.

In accordance with various embodiments, load balancing may be performed during the path selection for groups of packets, which may be referred to as "flowlets." In some implementations, flowlets may correspond to bursts of packets. Accordingly, flowlets of a single flow may be transmitted via two or more paths.

Generally, the techniques for performing the disclosed embodiments may be implemented by a device such as a network device. In some embodiments, the network device is designed to handle network traffic. Such network devices typically have multiple network interfaces. Specific examples of such network devices include routers and switches.

The disclosed embodiments may be implemented in one or more network devices within a network. A few example network architectures will be described in further detail below.

Leaf-Spine Network Architecture Versus Access-Aggregation-Core Network Architecture In order to meet the demands of a worldwide user base, the modern datacenter may be composed of hundreds, thousands, or even tens of thousands of data servers. However, a large number of servers within a datacenter places a corresponding high demand on the datacenter's networking infrastructure. Network traffic taxing this infrastructure may represent communications between servers within the datacenter itself, or it may represent requests for information or services originating outside the datacenter, such as from client computers located throughout the worldwide internet (hereinafter just "internet"). With regards to the latter, the total number of servers in a datacenter is typically many times the total number of connections to the internet, and so the sharing of a limited number of internet connections between many servers is typically an important consideration.

"Access-Aggregation-Core" Network Architecture

Datacenter network design may follow a variety of topological paradigms—a given topology just referring to the system of networking lines/links which carry network traffic (i.e., data) and the networking switches, which control the flow of traffic over the lines/links in the network. One of the most common topological paradigms in use today is the aptly-named "access-aggregation-core" architecture. As the "core" part of the name suggests, such an architecture follows a hierarchical paradigm, wherein information traveling between hypothetical points A and B, first travel up the hierarchy away from point A and then back down the hierarchy towards point B.

FIG. 1 schematically illustrates a simple network 100 made up of 12 "end devices" 110 (e.g., servers) which, following the "access-aggregation-core" (AAC) model, are connected through an access tier 120, an aggregation tier 130, and a top-level core tier 140. Within each tier are "network devices" 125 (e.g., ethernet switches) each of which controls flow of network traffic over various "links" 115 (e.g., ethernet cable) between it and the other network devices 125 and ultimately to and from end devices 110. As shown in FIG. 1, it is access tier 120 which provides each end device 110 with immediate access to the network. From there, traffic may pass to the aggregation tier 130, and then to the core tier 140, depending on its final destination. It is noted that for traffic whose final destination is within the network 100 shown in FIG. 1, how far up the hierarchy the traffic must be directed to reach this destination depends on the location of the destination within the network. Traffic whose final destination is outside the network shown in FIG. 1—e.g., to some server on the worldwide internet—will typically travel all the way up the hierarchy, since the connection or connections to the outside internet typically reside in the core tier. It is also noted that while FIG. 1 portrays each network device 125 identically for purposes of illustration, actual hardware implementations of such devices may possess substantial differences depending on whether the device is located in the access tier 120, the aggregation tier 130, or the core tier 140. For one thing, the single network device in the core tier 140 of FIG. 1 would typically route more traffic (for the reasons just described) than those network devices in the other layers, and so it's hardware would be chosen accordingly. Moreover, differing hardware implementations in one tier versus another may be dictated by whether the devices in each tier do bridging or routing, or both. For instance, the access tier typically does only bridging, the aggregation tier a combination of bridging and routing—bridging and routing between interfaces going to the access tier and routing to all others—and the core tier, only routing. Note that the term "end device" 110 refers to a device connected to the network which is identified on the network and uses the network to communicate with other devices connected to the network. As such, the end device 110 may be personal computer, a workstation, a server, or a device which may not be a computer per se such as, for example, a network printer, scanner, network storage device, etc. Also note that while a computer, server, workstation, etc. may be a physical device having one or more processors (each potentially having one or more cores) connected to an array of random-access memory (RAM) and possibly a non-volatile storage medium (such as a magnetic disc, flash drive, optical disc, magnetic tape, etc.), an end device 110 may also be a virtual device, such as a virtualized server running in a virtualization environment—such as VMWare—atop an actual physical server. Finally, it is also noted that in some embodiments, what is designated as an "end device," may actually refer to multiple computers, the distinction being that for purposes of network topology they share the same connection to the network and therefore operate substantially as a single networked unit.

FIG. 1 illustrates the hierarchal connectivity of a access-aggregation-core (AAC) network model and shows that, from core to end device, the architecture follows a tree structure or graph—meaning that each network device within the network is only connected to a single device above it in the hierarchy, but is potentially connected to multiple network devices below it. The tree structure also implies, as seen from the figure, that there is a single unique path—i.e., sequence of links—connecting any two end devices on the network. However, though each pair of end devices is connected by a unique path, paths between different pairs of end devices may, but not necessarily, use the same links along some portion of their route. For example, with regards to the specific network shown in FIG. 1, the end devices 110 labeled A and F (hereinafter "end device A" and so forth) communicate over a path through network devices 1, II, and then 3. Likewise end devices I and J communicate over a path through network devices 4, III, and then 5, and so these two paths do not overlap (i.e. the paths have no links in common). However, if end device A instead communicates with end device K (while I communicates with J), then both paths pass through network devices III and 5 (and the link adjoining devices III and 5).

Shared usage of links and network devices (such as just described) leads to bottlenecks in a network exhibiting a tree structure architecture like the access-aggregation-core (AAC) network shown in FIG. 1. For sake of simplicity, assume that in a given AAC network, data transmission over each link and through each network device is limited to the same maximum data transmission rate, and that each end device on this network can send and receive data at this maximum rate as well. In other words, the same bandwidth limitation applies to the whole network. If this is so, then referring again to FIG. 1, end devices A and B are able to communicate at full bandwidth, while end devices I and J are also communicating at full bandwidth. However, to use the previous example, if end device A attempts to communicate with end device K while end device I is communicating with end device J, then "blocking" occurs—e.g., either both pairs of end devices communicate at half maximum bandwidth, or they communicate at full bandwidth sequentially, one pair waiting for the other pair to finish. Obviously, the situation becomes much worse in an AAC network if many end devices which are topologically-separate from each other (i.e., their communication paths involve many links) attempt to simultaneously communicate with one another at full bandwidth.

Though the blocking problem is an inevitable consequence of the tree-structure paradigm, various solutions have been developed within this paradigm to lessen the impact of the problem. One technique is to build redundancy into the network by adding additional links between high traffic nodes in the network. In reference to FIG. 1, this might mean adding extra links between the core tier network device I, and the aggregation tier network devices II and III. Split-etherchannel and the like are examples implementing such an approach. Alternatively, instead of adding more links, standard-bandwidth links may be replaced by higher-bandwidth links, but the effect is essentially the same, albeit the consequences of link failure will be more severe versus having redundant links. With regards to link failure, it is noted in reference to FIG. 1 that even if redundant links are employed between the core and aggregation tiers, 1 link failure out of 4 in this simple example would reduce the network's bisectional bandwidth by a factor of 2. ("Bisectional bandwidth" is discussed in detail below.) Thus, it is evident that even with built-in redundancy, a tree-structured network architecture has inherent limitations, and, of course, there are costs associated with implementing hardware-based redundancy.

"Leaf-Spine" Network Architecture

Another way of addressing the ubiquitous "blocking" problem manifested in the modern datacenter's networking infrastructure is to design a new network around a topological paradigm where blocking does not present as much of an inherent problem. One such topology is often referred to as a "multi-rooted tree" topology (as opposed to a "tree"), which can be said to embody a full bi-partite graph if each spine network device is connected to each Leaf network device and vice versa. Networks based on this topology are oftentimes referred to as "Clos Networks," "flat networks," "multi-rooted networks," or just as "multi-rooted trees." In the disclosure that follows, a "leaf-spine" network architecture designed around the concept of a "multi-rooted tree" topology will be described. While it is true that real-world networks are unlikely to completely eliminate the "blocking" problem, the described "leaf-spine" network architecture, as well as others based on "multi-rooted tree" topologies, are designed so that blocking does not occur to the same extent as in traditional network architectures.

Roughly speaking, leaf-spine networks lessen the blocking problem experienced by traditional networks by being less hierarchical and, moreover, by including considerable active path redundancy. In analogy to microprocessor design where increased performance is realized through multi-core or multi-processor parallelization rather than simply by increasing processor clock speed, a leaf-spine network realizes higher performance, at least to a certain extent, by building the network "out" instead of building it "up" in a hierarchical fashion. Thus, a leaf-spine network in its basic form consists of two-tiers, a spine tier and leaf tier. Network devices within the leaf tier—i.e. "leaf network devices"— provide connections to all the end devices, and network devices within the spine tier—i.e., "spine network devices"—provide connections among the leaf network devices. Note that in a prototypical leaf-spine network, leaf network devices do not directly communicate with each other, and the same is true of spine network devices. Moreover, in contrast to an AAC network, a leaf-spine network in its basic form has no third core tier connecting the network devices within the second tier to a much smaller number of core network device(s), typically configured in a redundant fashion, which then connect to the outside internet. Instead, the third tier core is absent and connection to the internet is provided through one of the leaf network devices, again effectively making the network less hierarchical. Notably, internet connectivity through a leaf network device avoids forming a traffic hotspot on the spine which would tend to bog down traffic not travelling to and from the outside internet.

It should be noted that very large leaf-spine networks may actually be formed from 3 tiers of network devices. As described in more detail below, in these configurations, the third tier may function as a "spine" which connects "leaves" formed from first and second tier network devices, but a 3-tier leaf-spine network still works very differently than a traditional AAC network due to the fact that it maintains the multi-rooted tree topology as well as other features. To present a simple example, the top tier of a 3-tier leaf-spine network still does not directly provide the internet connection(s), that still being provided through a leaf network device, as in a basic 2-tier leaf-spine network.

Figure 2:
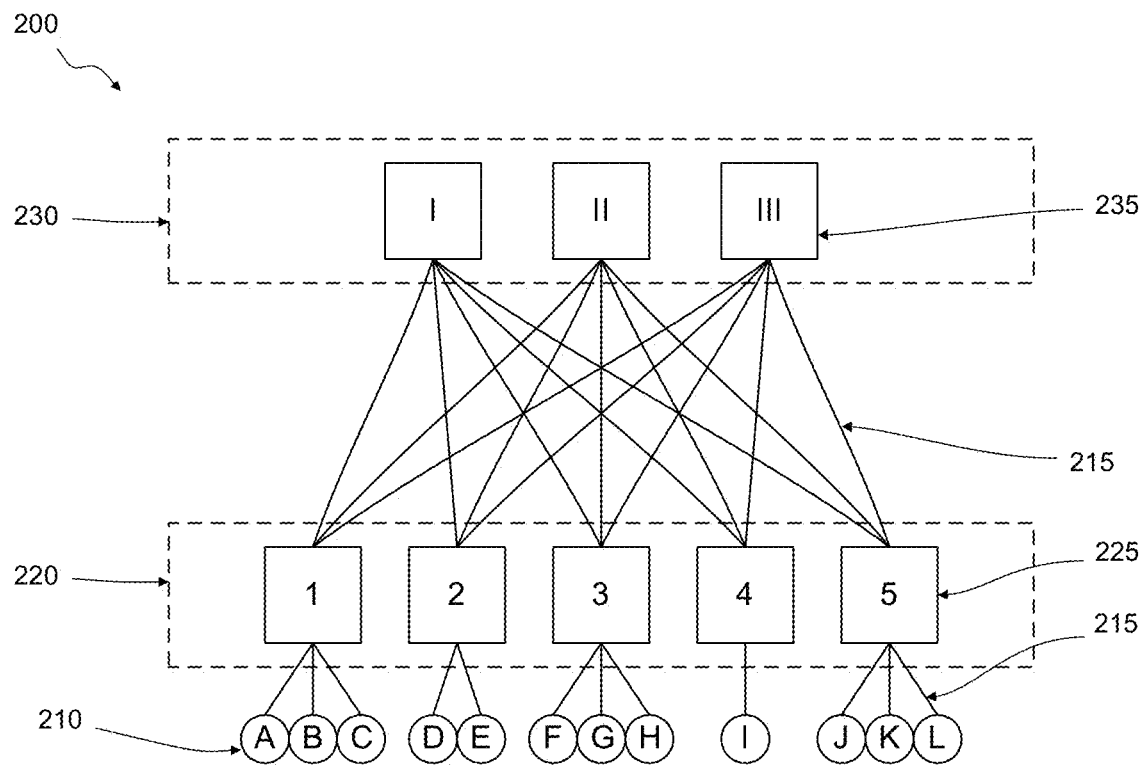
FIG. 2 is a diagrammatic representation of an example leaf-spine network in which various embodiments may be implemented.

FIG. 2 schematically illustrates a particular example of a basic leaf-spine network 200. To a certain extent, network 200 is analogous (or is the counterpart of) the AAC network 100 shown in FIG. 1. Both provide connectivity for 12 end devices which directly connect to 5 network devices in a first tier, in the case of network 200, to the 5 leaf network devices 225 of leaf tier 220, which are analogous to the 5 network devices 125 of the access tier 120 of the AAC network 100. However, moving on to the second tier, unlike the AAC network 100 which has a 2-network device aggregation tier 130 and a 1-network device core tier 140, the leaf-spine network 200 employs just a single additional tier, the spine tier 230, which consists of 3 spine-network devices 235.

Though in FIGS. 1 and 2 the total number of network devices in the higher tiers remains the same, the connectivity of these devices is quite different. FIG. 2 shows that in a prototypical leaf-spine network, every leaf network device 225 is connected to multiple spine network devices 235 creating the so-called "multi-rooted tree" topology—differing from the ordinary tree topology of an AAC network where each network device is connected to only one network device above it in the hierarchy. As a consequence and unlike an AAC network, in a leaf-spine network there are multiple paths of communication between any pair of leaf network devices 225, and thus also between any pair of end devices 210 connected to different leaf network devices. The multi-path topology which joins the end devices in these networks is a characteristic which helps to reduce the extent to which "blocking" poses a problem. Moreover, leaf-spine networks are such that if a sufficient number of spine network devices are connected with sufficient bandwidth to the leaf network devices, a leaf-spine network may provide what is referred to as "full bisectional bandwidth," as described in more detail below. Furthermore, by adding additional tiers (such as a third tier as mentioned above and as described in greater detail below), a network of arbitrary size can be built that still provides "full bisectional bandwidth."

To illustrate, consider analogously to the example described above, communication between end device A and end device K simultaneous with communication between end devices I and J, which led to blocking in AAC network 100. As shown in FIG. 2, in the leaf-spine network 200, there are three paths connecting end device A with end device K and three different paths connecting end device I with end device J illustrating that no blocking problem arises. Again, assuming all links in the network provide equal bandwidth, the two pairs of end devices each have available 3 times the required bandwidth for max rate communication and thus the network is non-blocking in this scenario.

As a second example, consider the scenario of simultaneous communication between end devices A and F and between end devices B and G which will clearly also lead to blocking in AAC network 100. In the leaf-spine network 200, although two leaf network devices 225 are shared between the four end devices 210, specifically network devices 1 and 3, there are still three paths of communication between these two devices (one through each of the three spine network devices I, II, and III) and therefore there are three paths collectively available to the two pairs of end devices. Thus, it is seen that this scenario is also non-blocking (unlike FIG. 1) because each pair of end devices still has access to 1.5 times the bandwidth required for max rate communication.

As a third example, consider the scenario of simultaneous communication between three pairs of end devices—between A and F, between B and G, and between C and H. In AAC network 100, this results in each pair of end devices having ⅓ the bandwidth required for full rate communication, but in leaf-spine network 200, once again, since 3 paths are available, each pair has exactly the bandwidth it needs for full rate communication. Thus, in a leaf-spine network having single links of equal bandwidth connecting devices, as long as the number of spine network devices 235 is equal to or greater than the number of end devices 210 which may be connected to any single leaf network device 225, then the network will have enough bandwidth for simultaneous full-rate communication between the end devices connected to the network.

More generally, the extent to which a given network is non-blocking may be characterized by the network's "bisectional bandwidth," which is determined by dividing a network that has N end devices attached to it into 2 equal sized groups of size N/2, and determining the total bandwidth available for communication between the two groups. If this is done for all possible divisions into groups of size N/2, the minimum bandwidth over all such divisions is the "bisectional bandwidth" of the network. Based on this definition, a network may then be said to have "full bisectional bandwidth" and have the property of being "fully non-blocking" if each leaf network device's total uplink bandwidth to the spine tier 230 (the sum of the bandwidths of all links connecting the leaf network device 225 to any spine network device 235) is at least equal to the maximum downlink bandwidth to end devices associated with any of the leaf network devices on the network.

To be precise, when a network is said to be "fully non-blocking" it means that no "admissible" set of simultaneous communications between end devices on the network will block—the admissibility constraint simply meaning that the non-blocking property only applies to sets of communications that do not direct more network traffic at a particular end device than that end device can accept as a consequence of its own bandwidth limitations. Whether a set of communications is "admissible" may therefore be characterized as a consequence of each end device's own bandwidth limitations (assumed here equal to the bandwidth limitation of each end device's link to the network), rather than arising from the topological properties of the network per se. Therefore, subject to the admissibility constraint, in a non-blocking leaf-spine network, all the end devices on the network may simultaneously communicate with each other without blocking, so long as each end device's own bandwidth limitations are not implicated.

The leaf-spine network 200 thus exhibits full bisectional bandwidth because each leaf network device has at least as much bandwidth to the spine tier (i.e., summing bandwidth over all links to spine network devices) as it does bandwidth to the end devices to which it is connected (i.e., summing bandwidth over all links to end devices). To illustrate the non-blocking property of network 200 with respect to admissible sets of communications, consider that if the 12 end devices in FIG. 2 are arbitrarily divided into 6 pairs, simultaneous communications between the 6 pairs are admissible, and thus may occur without blocking in network 200. In addition, it is noted that the non-blocking property of leaf-spine network 200 will be preserved if up to 15 end devices are connected, 3 to each of the 5 leaf network devices.

To implement leaf-spine network 200, the leaf tier 220 would typically be formed from 5 ethernet switches of 6 ports or more, and the spine tier 230 from 3 ethernet switches of 5 ports or more. The number of end devices which may be connected is then the number of leaf tier switches j multiplied by ½ the number of ports n on each leaf tier switch, or $\frac{1}{2} \cdot j \cdot n$, which for the network of FIG. 2 is $\frac{1}{2} \cdot 5 \cdot 6 = 15$. Furthermore, the number of ports m on each spine tier switch is equal to the number of leaf tier switches j (so long as the maximum number of leaf tier switches are used), and so the total number of end devices is also given by $\frac{1}{2} \cdot m \cdot n$, where m is the number of ports on the spine tier switches, and n is the number of ports on the leaf tier switches.

However, not every network is required to be non-blocking and, depending on the purpose for which a particular network is built and the network's anticipated loads, a fully non-blocking network may simply not be cost-effective. Nevertheless, leaf-spine networks still provide advantages over traditional networks, and they can be made more cost-effective, when appropriate, by reducing the number of devices used in the spine tier, or by reducing the link bandwidth between individual spine and leaf tier devices, or both. In some cases, the cost-savings associated with using fewer spine-network devices can be achieved without a corresponding reduction in bandwidth between the leaf and spine tiers by using a leaf-to-spine link speed which is greater than the link speed between the leaf tier and the end devices. If the leaf-to-spine link speed is chosen to be high enough, a leaf-spine network may still be made to be fully non-blocking—despite saving costs by using fewer spine network devices.

The extent to which a network having fewer spine tier devices is non-blocking is given by the smallest ratio of leaf-to-spine uplink bandwidth versus leaf-to-end-device downlink bandwidth assessed over all leaf network devices. By adjusting this ratio, an appropriate balance between cost and performance can be dialed in. In FIG. 2, for example, assuming links have equal bandwidth, one spine network device 235 could be eliminated if a blocking ratio of 3:2 was acceptable. This would imply that if 3 end devices connected to a single leaf network device attempt simultaneous communication to 3 or more end devices attached to other leaf networking devices, only ⅔ of the required bandwidth would be available. This is also referred to as "oversubscription." In this case, the "oversubscription rate" would be 1.5, since $1.5 = (\frac{2}{3})^{-1}$. Of course, as described above, increasing the leaf-spine uplink bandwidth between the remaining spine network devices and the leaf network devices could eliminate this oversubscription, albeit at a cost which may or may not be warranted depending on the network's anticipated loads.

This concept of oversubscription and building cost-effective networks having less than optimal bandwidth between spine and leaf network devices also illustrates the improved failure domain provided by leaf-spine networks versus their traditional counterparts. In a traditional AAC network, if a device in the aggregation tier fails, then every device below it in the network's hierarchy will become inaccessible until the device can be restored to operation (assuming no split etherchannel or equal cost multi-pathing (ECMP)). Furthermore, even if redundancy is built-in to that particular device, or if it is paired with a redundant device, or if it is a link to the device which has failed and there are redundant links in place, such a failure will still result in a 50% reduction in bandwidth, or a doubling of the oversubscription. In contrast, redundancy is intrinsically built into a leaf-spine network and such redundancy is much more extensive. Thus, as illustrated by the usefulness of purposefully assembling a leaf-spine network with fewer spine network devices than is optimal, absence or failure of a single device in the spine (or link to the spine) will only typically reduce bandwidth by 1/k where k is the total number of spine network devices.

It is also noted once more that in some networks having fewer than the optimal number of spine network devices (e.g., less than the number of end devices connecting to the leaf network devices), the oversubscription rate may still be reduced (or eliminated) by the use of higher bandwidth links between the leaf and spine network devices relative to those used to connect end devices to the leaf network devices.

Example "Leaf-Spine" Network Architecture

The following describes an example implementation of a leaf-spine network architecture. It is to be understood, however, that the specific details presented here are for purposes of illustration only, and are not to be viewed in any manner as limiting the concepts disclosed herein. With this in mind, leaf-spine networks may be implemented as follows:

Leaf network devices may be implemented as ethernet switches having: (i) 48 ports for connecting up to 48 end devices (e.g., servers) at data transmission speeds of 10 GB/s (gigabits per second)—i.e. 'downlink ports'; and (ii) 12 ports for connecting to up to 12 spine network devices at data transmission speeds of 40 GB/s—i.e. 'uplink ports.' Thus, each leaf network device has 480 GB/s total bandwidth available for server connections and an equivalent 480 GB/s total bandwidth available for connections to the spine tier. More generally, leaf network devices may be chosen to have a number of ports in the range of 10 to 50 ports, or 20 to 100 ports, or 50 to 1000 ports, or 100 to 2000 ports, wherein some fraction of the total number of ports are used to connect end devices (downlink ports') and some fraction are used to connect to spine network devices (uplink ports'). In some embodiments, the ratio of uplink to downlink ports of a leaf network device may be 1:1, or 1:2, or 1:4, or the aforementioned ratio may be in the range of 1:1 to 1:20, or 1:1 to 1:10, or 1:1 to 1:5, or 1:2 to 1:5. Likewise, the uplink ports for connection to the spine tier may have the same bandwidth as the downlink ports used for end device connection, or they may have different bandwidths, and in some embodiments, higher bandwidths. For instance, in some embodiments, uplink ports may have bandwidths which are in a range of 1 to 100 times, or 1 to 50 times, or 1 to 10 times, or 1 to 5 times, or 2 to 5 times the bandwidth of downlink ports. In the particular embodiment described above, the bandwidth of the uplink ports is 4 times the bandwidth of the downlink ports—e.g., downlink port data transmission speeds are 10 GB/s and uplink port data transmission speeds are 40 GB/s. Depending on the embodiment, the downlink data transmission speed may be selected to be 10 MB/s (megabit/second), 100 MB/s, 1 GB/s (gigabit/second), 10 GB/s, 40 GB/s, 100 GB/s, 1 TB/s (terabit/second), and the corresponding uplink port data transmission speed may be chosen according to the foregoing proportions (of uplink to downlink port transmission speeds). Likewise, depending on the embodiment, the downlink data transmission speed may be selected from within a range of between about 10 MB/s and 1 TB/s, or between about 1 GB/s and 100 GB/s, or between about 10 GB/s and 40 GB/s, and the corresponding uplink port data transmission speed may also be chosen according to the previously described proportions (of uplink to downlink port transmission speeds).

Moreover, depending on the embodiment, leaf network devices may be switches having a fixed number of ports, or they may be modular, wherein the number of ports in a leaf network device may be increased by adding additional modules. The leaf network device just described having 48 10 GB/s downlink ports (for end device connection) and 12 40 GB/s uplink ports (for spine tier connection) may be a fixed-sized switch, and is sometimes referred to as a 'Top-of-Rack' switch. Fixed-sized switches having a larger number of ports are also possible, however, typically ranging in size from 48 to 150 ports, or more specifically from 48 to 100 ports, and may or may not have additional uplink ports (for communication to the spine tier) potentially of higher bandwidth than the downlink ports. In modular leaf network devices, the number of ports obviously depends on how many modules are employed. In some embodiments, ports are added via multi-port line cards in similar manner to that described below with regards to modular spine network devices.

Spine network devices may be implemented as ethernet switches having 576 ports for connecting with up to 576 leaf network devices at data transmission speeds of 40 GB/s. More generally, spine network devices may be chosen to have a number of ports for leaf network device connections in the range of 10 to 50 ports, or 20 to 100 ports, or 50 to 1000 ports, or 100 to 2000 ports. In some embodiments, ports may be added to a spine network device in modular fashion. For example, a module for adding ports to a spine network device may contain a number of ports in a range of 10 to 50 ports, or 20 to 100 ports. In this manner, the number of ports in the spine network devices of a growing network may be increased as needed by adding line cards, each providing some number of ports. Thus, for example, a 36-port spine network device could be assembled from a single 36-port line card, a 72-port spine network device from two 36-port line cards, a 108-port spine network device from a trio of 36-port line cards, a 576-port spine network device could be assembled from 16 36-port line cards, and so on.

Links between the spine and leaf tiers may be implemented as 40 GB/s-capable ethernet cable (such as appropriate fiber optic cable) or the like, and server links to the leaf tier may be implemented as 10 GB/s-capable ethernet cable or the like. More generally, links, e.g. cables, for connecting spine network devices to leaf network devices may have bandwidths which are in a range of 1 GB/s to 1000 GB/s, or 10 GB/s to 100 GB/s, or 20 GB/s to 50 GB/s. Likewise, links, e.g. cables, for connecting leaf network devices to end devices may have bandwidths which are in a range of 10 MB/s to 100 GB/s, or 1 GB/s to 50 GB/s, or 5 GB/s to 20 GB/s. In some embodiments, as indicated above, links, e.g. cables, between leaf network devices and spine network devices may have higher bandwidth than links, e.g. cable, between leaf network devices and end devices. For instance, in some embodiments, links, e.g. cables, for connecting leaf network devices to spine network devices may have bandwidths which are in a range of 1 to 100 times, or 1 to 50 times, or 1 to 10 times, or 1 to 5 times, or 2 to 5 times the bandwidth of links, e.g. cables, used to connect leaf network devices to end devices.

In the particular example of each spine network device implemented as a 576-port @ 40 GB/s switch and each leaf network device implemented as a 48-port @ 10 GB/s downlink & 12-port @ 40 GB/s uplink switch, the network can have up to 576 leaf network devices each of which can connect up to 48 servers, and so the leaf-spine network architecture can support up to 576·48=27,648 servers. And, in this particular example, due to the maximum leaf-to-spine transmission rate (of 40 GB/s) being 4 times that of the maximum leaf-to-server transmission rate (of 10 GB/s), such a network having 12 spine network devices is fully non-blocking and has full cross-sectional bandwidth.

As described above, the network architect can balance cost with oversubscription by adjusting the number of spine network devices. In this example, a setup employing 576-port switches as spine network devices may typically employ 4 spine network devices which, in a network of 576 leaf network devices, corresponds to an oversubscription rate of 3:1. Adding a set of 4 more 576-port spine network devices changes the oversubscription rate to 3:2, and so forth.

Datacenters typically consist of servers mounted in racks. Thus, in a typical setup, one leaf network device, such as the 'Top-of-Rack' device described above, can be placed in each rack providing connectivity for up to 48 rack-mounted servers. The total network then may consist of up to 576 of these racks connected via their leaf-network devices to a spine-tier rack containing between 4 and 12 576-port spine tier devices.

Leaf-Spine Network Architectures Formed from More than Two Tiers of Network Devices The two-tier leaf-spine network architecture described above having 576-port @ 40 GB/s switches as spine network devices and 48-port @ 10 GB/s downlink & 12-port @ 40 GB/s uplink switches as leaf network devices can support a network of up to 27,648 servers, and while this may be adequate for most datacenters, it may not be adequate for all. Even larger networks can be created by employing spine tier devices with more than 576 ports accompanied by a corresponding increased number of leaf tier devices. However, another mechanism for assembling a larger network is to employ a multi-rooted tree topology built from more than two tiers of network devices—e.g., forming the network from 3 tiers of network devices, or from 4 tiers of network devices, etc.

One simple example of a 3-tier leaf-spine network may be built from just 4-port switches and this is schematically illustrated in FIGS. 3A-1, 3A-2, and 3B, in order to convey the general principle. Of course, it is to be understood that to build a large 3-tier network, larger switches would be employed. FIG. 3A-1 shows 4 4-port switches 322 (labeled "1-1," "1-2," "1-3," "1-4") connected to form a 2-tier leaf-spine network 301 for connecting 4 end devices 310 (labeled "A," "B," "C," "D") with switches 1-1 and 1-2 serving as leaf network devices, and switches 1-3 and 1-4 serving as spine network devices. Note that a leaf-spine network assembled from 4-port switches would generally support a network of 8 end devices 310, connected through 2 spine-network devices and 4 leaf network devices, but here, half the ports on the switches serving as spine network devices, switches 1-3 and 1-4, have their links pointed upward in FIG. 3A-1 to schematically indicate these links are reserved for uplink connection to a third tier. With the 4 4-port switches 322 connected in this manner, they may collectively be viewed as functioning as an 8 port switch 325, as schematically illustrated in FIG. 3A-2 (and labeled "1"), with 4 downlinks 305 to potential end devices 310 and 4 uplinks 315 to a potential third tier. Such an effective 8-port switch may then serve as a building-block for a 3-tier leaf-spine network.

FIG. 3B then shows how a 3-tier leaf-spine network 302 may be assembled from these 8-port building blocks. As shown in the figure, 4 8-port building blocks 325 may effectively serve as 4 leaf-network devices (labeled "1," "2," "3," "4,") in the leaf tier 320 of network 302. The spine tier 330 of network 302 is formed from 4 additional 4-port switches 335 (labeled "I," "II," "III," "IV"), similar to those used to form each 8-port leaf network device 325. Thus, when viewed in terms of 4-port switches, network 302 consists of 3 tiers with 8 4-port switches in the bottom tier, 8 4-port switches in the middle tier, and 4 4-port switches in the top tier, though this network may still be viewed as having a leaf tier 320 and spine tier 330, as just described. It is seen in the figure, that network 302 may connect up to 16 end devices 310. Generalizing this, it is noted that a 3-tier leaf-spine network may connect a total number of end devices equal to ¼·l·m·n, where l, m, and n are the number of ports in the devices forming the top, middle, and bottom tiers, respectively (e.g., in FIG. 3B, ¼·4·4·4=16). Thus, if n-port devices are used to build a network, the size of a 3-tier leaf-spine network scales as approximately $n^3$, whereas the size of a 2-tier leaf-spine network scales only as $n^2$. Accordingly, leaf-spine network architectures employing 3 tiers of network devices open up the possibility of efficiently assembling even larger networks.

The disclosed embodiments enable load balancing to be performed during the path selection process in a network such as a leaf-spine network. In the following description, ports of leaf devices that are connected to spine devices will be referred to as uplinks, while ports of spine devices that are connected to leaf devices will be referred to as downlinks. While the disclosed embodiments may be implemented at one leaf tier and one spine tier, they may also be applied to leaf-spine topologies that include further spine tiers. The disclosed embodiments may effectively load balance traffic, even in the presence of asymmetries in the topology such as missing links or differences in link speeds. Through the application of the disclosed embodiments, it is possible to eliminate or reduce collisions that can occur on paths in the network.

In some embodiments, load balancing may be performed for all network traffic. In other embodiments, dynamical load balancing may be performed solely for unicast traffic. More particularly, in some implementations, dynamic load balancing may be performed only for unicast traffic in drop classes. In these embodiments, for multicast and/or no-drop unicast traffic, a method such as standard ECMP may be used for load-balancing.

In accordance with various embodiments, path selection may be performed on a per-flowlet basis. Generally, flowlets may be bursts of packets from a flow that are separated by large enough gaps such that they can be routed independently via different paths without causing reordering. By taking into consideration the gaps between the flowlets, a sequential order of all packets in the flow may be maintained.

Figure 4:
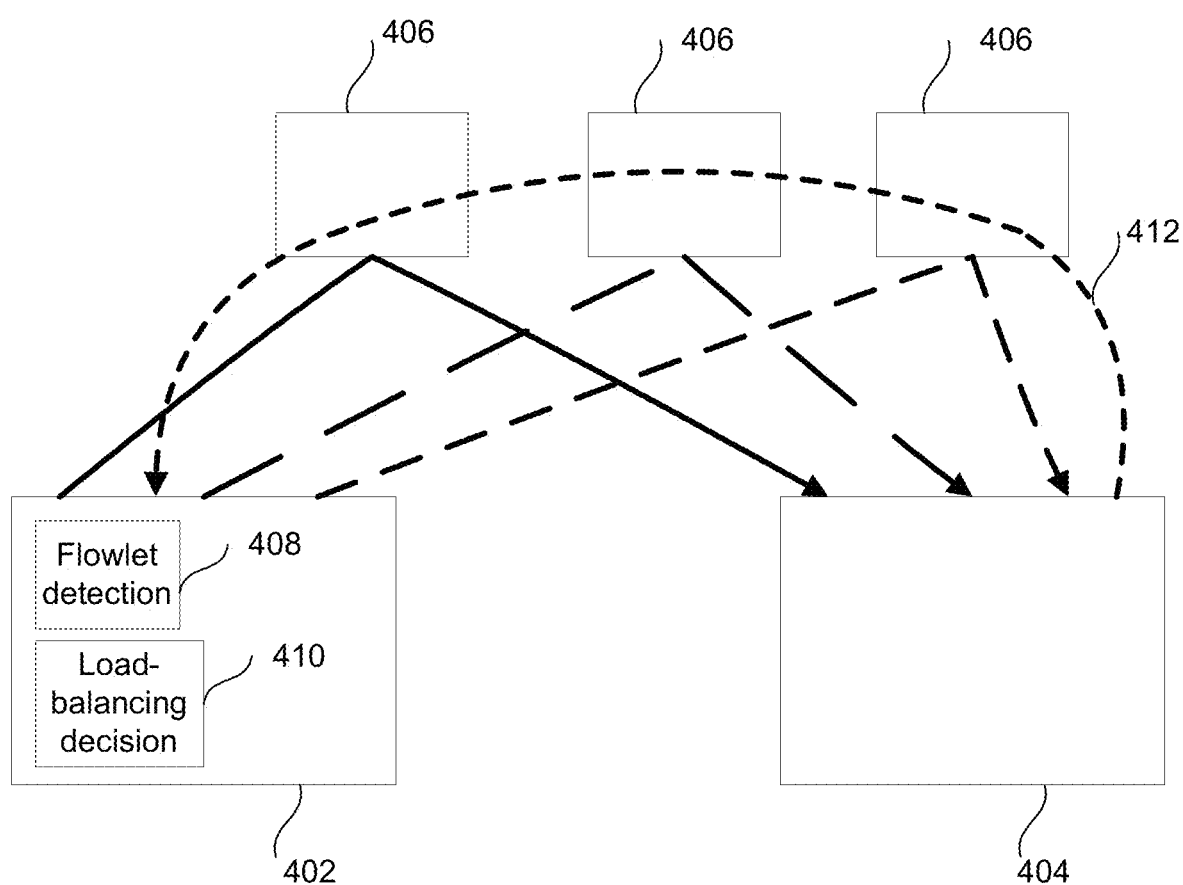
FIG. 4 is a diagram illustrating the basic operation of a load balancing system in accordance with various embodiments.

FIG. 4 is a diagram illustrating the basic operation of a load balancing system in accordance with various embodiments. As shown in this diagram, the system may include a leaf tier including two or more leaf devices 402, 404 and at least one spine tier including a plurality of spine devices 406. At a high-level, one of the leaf devices may operate as a source leaf device 402 to send a packet to one of the leaf devices operating as a destination leaf device 404. More particularly, the source leaf device 402 may perform flowlet detection 408 to detect flowlets as they are being sent into the fabric.

In accordance with various embodiments, a flowlet (e.g., burst) may be identified by the presence of at least a pre-defined time delay that separates it from another previous or subsequent flowlet. More particularly, a time gap between the receipt of two sequentially received packets from a flow may be ascertained by comparing a time of receipt (e.g., a time stamp) of the two sequentially received packets. The presence of less than a pre-defined time delay between the two packets results in the two packets being grouped in the same flowlet of packets. Conversely, the presence of at least the pre-defined time delay between the two packet may result in the two packets being grouped in two different flowlets. Accordingly, the identification of a particular packet as being within a particular flowlet may be determined, at least in part, according to the time that the packet has been received.

For each "new" flowlet, the source leaf device 402 makes a load balancing decision 410 to pick the "best" port of the source leaf device 402 via which to send the flowlet. In some embodiments, the "best" port is the one through which packets experience the least end-to-end congestion en route to their destination leaf device. More particularly, any of the spine devices 406 intercepting the packet may perform congestion detection and provide an indicator of a level of congestion present at the spine device 406 in a header of the packet. The destination leaf device 404 may ascertain a level of end-to-end congestion based, at least in part, upon the indicator of the level of congestion provided by the spine device 406. In some implementations, the level of end-to-end congestion may be a maximum level of congestion experienced on route from the source leaf device 402 to the destination leaf device 404. In another implementation, the level of end-to-end congestion may be the sum of the congestion levels at each link along the route from the source leaf device 402 to the destination leaf device 404. The destination leaf device 404 may transmit congestion state feedback 412 to the source leaf device 402, where the congestion state feedback 412 indicates the level of end-to-end congestion experienced by packet(s) on the route from the source leaf device 402 to the destination leaf device 404.

In accordance with various embodiments, a feedback mechanism may be used to monitor congestion in the fabric. The feedback mechanism may be implemented through the use of header field(s) in one or more headers of a packet transmitted between two leaf devices. In this manner, congestion state information and feedback may be carried through the fabric.

In some embodiments, the packet may be a VXLAN frame. As a result, the packet fields described herein may be implemented within fields of VXLAN frame. More particularly, the fields may be within inner and/or outer header(s) of a VXLAN frame. For example, the fields may be implemented in a User Datagram Protocol (UDP) header and/or VXLAN header. However, it is important to note that the packet may conform to any protocol. Therefore, the term packet will be used herein to refer to any packet or frame that is transmitted within the network.

Since the fields may be implemented in any fields of packet header(s), the pertinent fields will be described in general terms in the following description. The fields may correspond to existing fields within packet header(s) or may correspond to new fields within new header(s) to be appended to the packet. In the following description, the fields are described as part of a packet having a generic packet payload. However, it is important to note that the payload may be any portion of a packet and may also include further headers. Additional header fields are not shown or described in the following examples to simplify the description.

Figure 5A:
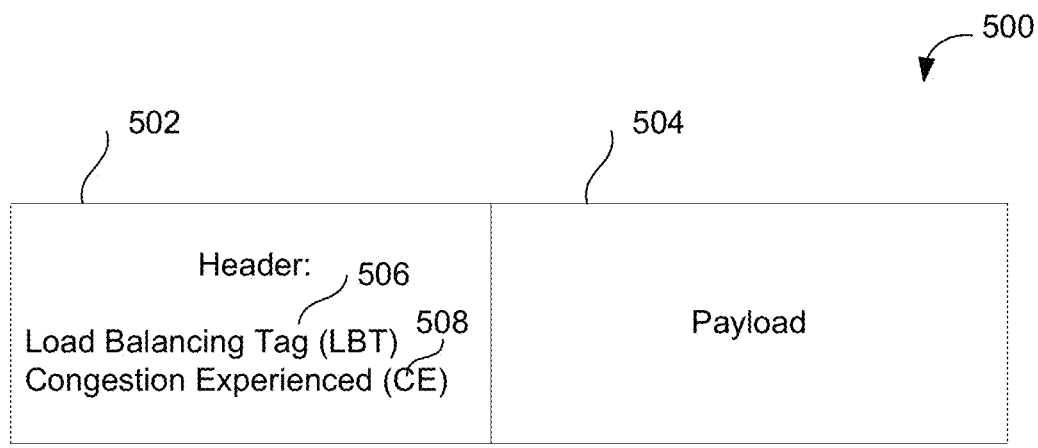
FIGS. 5A-C are diagrams illustrating example fields that may be implemented in a packet header in accordance with various embodiments.
Figure 5B:
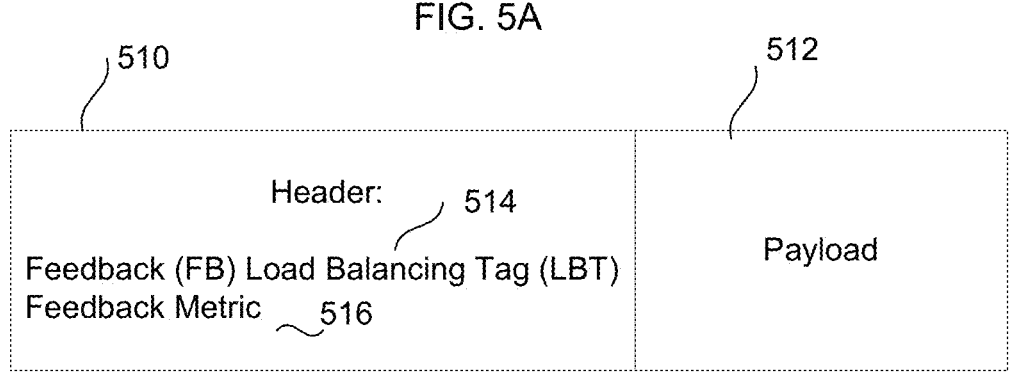
Figure 5C:
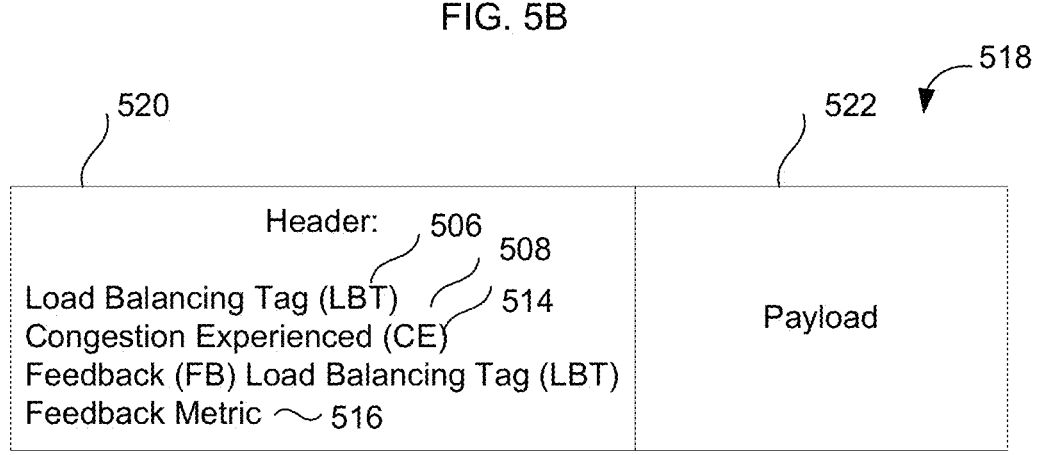

FIGS. 5A-C are diagrams illustrating example fields that may be implemented in a packet header in accordance with various embodiments. As shown in FIG. 5A, a packet 500 transmitted by a leaf device acting as a source leaf device may include a packet header 502 and a payload 504. The packet header 502 may include a Load-Balancing Tag (LBT) field 506 and a Congestion Experienced (CE) field 508.

The LBT field 506 may include a LBT. For example, the LBT may include a port number identifying a port (e.g., uplink) of a source leaf device transmitting the packet 500. It is not practical to maintain congestion information for every path between source and destination leaf devices, since there may, in general, be a very large number (e.g., hundreds) of such paths. Since multiple paths may originate from the port of the source leaf device, the LBT may operate as a generic identifier that represents all paths (e.g., for various packets or flowlets) that originate from the port. In some implementations, the LBT field 506 may be carried in a Source Port field of an outer UDP header.

In addition, the LBT field 506 (or another field) may include a hash of information (e.g., flow information) from inner frame header(s). A network device may select a next-hop by performing a hash on the outer frame header. Therefore, the path that the path takes may be selected based upon the LBT and the inner flow hash.

As described above, the LBT field may include a port number that the packet is sent from. However, if the packet is sent from a virtual address rather than a physical address, the LBT may include another form of identifier. For example, the LBT may be an identifier of the spine device to which the packet is sent.

The CE field 508 may include a value specifying congestion information indicating a level of congestion experienced by the packet 500 as it traverses through the fabric on a route from a source leaf device transmitting the packet 500 to a destination leaf device. More particularly, the level of congestion may be a maximum level of congestion experienced by the packet 500 on the path between the uplink of the source leaf device and the destination leaf device. For example, the level of congestion may include a maximum link utilization along the path. As another example, the level of congestion may include the sum of the link utilization along the path. In this manner, each packet may carry a value that indicates the extent of congestion it experiences as it traverses through the fabric. As the packet 500 traverses the fabric, the value may be modified, as will be described in further detail below with reference to FIG. 6.

The congestion information and the LBT may be retrieved from the packet 500 by the destination leaf device, and the destination leaf device may store the congestion information, or otherwise update previously stored congestion information, in association with the LBT. More particularly, the destination leaf device may aggregate congestion information for each of a plurality of uplinks (e.g., identified by LBTs) of the source leaf device, as will be described in further detail below. The destination leaf device may opportunistically transmit congestion state feedback indicating the congestion information associated with the LBT (e.g., as stored at the destination leaf device) to the source leaf device by piggybacking on packets in the reverse direction.

FIG. 5A illustrates example header fields that may be used by a leaf device acting as a source leaf device to convey the level of congestion (e.g., maximum or total level of congestion) a packet experiences as it traverses the fabric from the pertinent port of the source leaf device to a destination leaf device, while FIG. 5B illustrates example header fields that may be used by a leaf device acting as a destination leaf device to convey a level of congestion (e.g., maximum or total level of congestion) that packet(s) experienced as they traversed the fabric from the pertinent port of the source leaf device to the destination leaf device.

As shown in FIG. 5B, a packet transmitted by a leaf device acting as a destination leaf device may include a header 510 and a payload 512. In this example, the header 510 includes a Feedback (FB) Load Balancing Tag (LBT) field 514 and a Feedback (FB) Metric field 516. The FB LBT field 514 may include a FB LBT identifying a port (e.g., uplink) of the source leaf device associated with a congestion feedback metric provided in the FB Metric field 516. In other words, the port identified in the FB LBT field may identify the port of the source leaf device for which the feedback is provided. The congestion feedback metric may indicate a level of congestion (e.g., maximum or total level of congestion) experienced by a previous packet (or multiple packets) that travelled through the fabric from the source leaf device to the destination leaf device.

In some embodiments, a value of zero in the FB Metric field 516 may indicate that the metric is invalid. As a result, a leaf device may choose not to send feedback pertaining to feedback metrics having a value of zero. In other words, a leaf device may choose to send feedback pertaining solely to feedback metrics having a value that is non-zero. In other embodiments, a feedback metric value of zero may be a valid feedback metric, and therefore may be sent as valid feedback.

As described above, the FB LBT field may include a port number identifying the port for which the feedback is provided. However, if the packet is addressed to a virtual address rather than a physical address, the FB LBT may include another form of identifier. For example, the FB LBT may be an identifier of the spine device connected to the set of ports for which the feedback is directed.

In the examples shown in FIGS. 5A and 5B, a leaf device acts either as a source leaf device or a destination leaf device, respectively. However, it is important to note that a given leaf device may act as both a source leaf device and a destination leaf device. For example, a first leaf device may act as a source leaf device to transmit a first packet to a second leaf device, while the first leaf device may also act as a destination leaf device that provides feedback pertaining to a second packet that it previously received from the second leaf device. As a result, any packet may carry two different pieces of information: 1) the congestion metric for its forward path and 2) feedback pertaining to a feedback congestion metric (e.g., pertaining to packet(s) previously received by the leaf device).

FIG. 5C is a diagram illustrating an example packet format of a packet 518 including both a congestion metric for its forward path and feedback that may be transmitted between leaf devices. In this example, the packet 518 includes a header 520 and a payload 522, where the header 520 includes the LBT field 506, the CE field 508, the FB LBT field 514, and the FB metric field 516, as described above with reference to FIGS. 5A and 5B. The LBT field 506 and CE field 508 of the packet 518 may be used by a leaf device for tracking the level of congestion experienced as the packet 518 travels through the fabric, while the FB LBT field 514 and FB metric field 516 may be used by the leaf device to provide congestion feedback indicating a level of congestion experienced by packet(s) it previously received. In other embodiments, the packet may include two separate headers such as those shown in FIGS. 5A and 5B. Since congestion may be tracked via the same packet in which congestion feedback is provided, bandwidth in the fabric may be conserved.

The disclosed embodiments may distribute traffic based, at least in part, upon the congestion state associated with each of the available paths (or ports). The congestion state associated with a given port (or corresponding LBT) may be designated via one or more congestion metrics. These metrics may be generated, updated, or otherwise provided by a source leaf device transmitting a packet, one or more spine devices that intercept and forwards the packet, and/or a destination leaf device that receives the packet.

FIGS. 6A-6C are diagrams illustrating example tables that may be maintained by each leaf device in accordance with various embodiments. FIG. A is a diagram illustrating an example Ingress Congestion State Table that may be maintained by a leaf device acting as a source leaf device in accordance with various embodiments. The Ingress Congestion State Table may enable a leaf device acting as a source leaf device to store a state of congestion for each one of the plurality of uplinks of the leaf device, with respect to each one of a plurality of destination leaf devices in the fabric, which may be represented as destination TEPs. The state of congestion for a given uplink may be designated via a remote congestion metric. In some embodiments, the remote congestion metric may be a numerical value (e.g., between 1 and 9) indicating a level of congestion that has been experienced between the corresponding uplink of the source leaf device and the destination leaf device. For example, the possible numerical values of a remote congestion metric may be mapped to different ranges of possible levels of congestion. In this example, the Ingress Congestion state Table includes a plurality of columns representing the uplinks of the leaf device and a plurality of rows representing a plurality of destination leaf devices.

The level of congestion may be a maximum level of congestion, a total level of congestion, an average level of congestion, a most recent level of congestion, or may be generated using any other suitable algorithm or calculation made with respect to feedback metric(s) received in association with the corresponding uplink-destination leaf device pair. More particularly, upon receiving a packet from a destination leaf device, the leaf device may obtain a FB LBT value identifying the port and a feedback metric from the packet header. The leaf device may then update the entry corresponding to the identified port and destination leaf device based, at least in part, upon the feedback metric.

In some implementations, entries in the Ingress Congestion State Table may further indicate a time that the entries (and corresponding remote congestion metrics) were most recently updated or, alternatively, may indicate an age of the corresponding remote congestion metrics. For example, an age or time stamp may be stored in association with each corresponding remote congestion metric.

In some embodiments, stale remote congestion metric values may be aged out. This may be accomplished, for example, by setting the corresponding values to zero. Alternatively, remote congestion metric values may be decayed. Decaying stale metrics in the Ingress Congestion State Table may ensure that traffic is sent on the ports corresponding to these metrics at some point (since the load balancer will select the port with the smallest metric value.) In other words, this may prevent a port with a high metric from being unused indefinitely FIG. 6B is a diagram illustrating an example Egress Congestion State Table that may be maintained by a leaf device acting as a destination leaf device in accordance with various embodiments. As shown in FIG. 6B, the Egress Congestion State Table may enable a leaf device acting as a destination leaf device to store a feedback congestion metric for uplinks of a plurality of source leaf devices, which may be represented as source TEPs. In this example, the Egress Congestion state Table includes a plurality of columns representing the uplinks of the corresponding source leaf device and a plurality of rows representing a plurality of source leaf devices. In some embodiments, the feedback congestion metric may be a numerical value (e.g., between 1 and 9) indicating a level of congestion that has been experienced between the destination leaf device and the corresponding uplink of the source leaf device. For example, the possible numerical values of a feedback congestion metric may be mapped to different ranges of possible levels of congestion.

The level of congestion may, for example, be a maximum level of congestion, a total level of congestion, an average level of congestion, a most recent level of congestion, or may be generated using any other suitable algorithm or calculation made with respect to remote congestion metric(s) received in association with the corresponding uplink-source leaf device pair. When the destination leaf device receives a packet from the source leaf device, the destination leaf device may obtain an identifier of the uplink of the source leaf device from the LBT field of the packet header and a value from the CE field, where the value indicates a level of congestion experienced by the packet on route from the uplink of the source leaf device to the destination leaf device. The destination leaf device may store this value or update a previously stored feedback metric value in an entry in the Egress Congestion State Table, where the entry corresponds to the source leaf device and LBT. When a second packet is to be transmitted to the source leaf device, the destination leaf device may provide a value identifying the uplink of the source leaf device in the FB LBT field of the second packet and the feedback metric from the corresponding entry in the Egress Congestion State Table in the FB metric field of the packet header of the second packet.

In some implementations, entries in the Egress Congestion State Table may further indicate a time that entries (and corresponding feedback metrics) were most recently updated or, alternatively, may indicate an age of the feedback metric. For example, an age or time stamp may be stored in association with each feedback metric. In addition, a change value (e.g., bit) may be stored in association with each feedback metric to indicate whether the metric has changed since the last time it was transmitted back to the source leaf device. This may enable the destination leaf device to select an entry for the next one of the uplinks of the source device for which feedback should be transmitted. For example, the destination leaf device may choose to send the feedback metric for the entry that has been most recently changed and that has not already been transmitted back to the source leaf device. Moreover, in some embodiments, stale feedback metric values may be aged out (e.g., by setting the values to zero) or decayed.

In some embodiments, the system may implement a bias toward a previously selected port for a given flow. Thus, a leaf device acting as a source leaf device may maintain a table to keep track of the ports that were previously selected for flows (or flowlets) processed by the leaf device. FIG. C is a diagram illustrating an example flowlet table that may be maintained by a leaf device acting as a source leaf device in accordance with various embodiments. More particularly, a leaf device acting as a source leaf device may store an identifier of the uplink via which the previous (or current) flowlet of a flow was transmitted.

In this example, the flowlet table may store a flow identifier (or flowlet identifier) in association with an identifier of the uplink that was previously selected for a previous flowlet of the flow. More particularly, the identifier of the uplink may identify the most recently selected (e.g., current) port for the last flowlet of the flow that was processed by the leaf device. As a result, all packets in a given flowlet may be transmitted via the uplink identified in the flowlet table.

In addition, the flowlet table may be used to detect gaps between packets of a particular flow, thereby identifying flowlets. This may be accomplished, for example, by storing a time of receipt (e.g., time stamp) of the last packet in the corresponding flow, enabling a comparison to be performed with respect to the time of receipt of a subsequently received packet in the flow. In some embodiments, one or more age indicators may be associated with each entry. For example, the age indicators may indicate an age (e.g., time of receipt of the last packet) of the corresponding flowlet and/or flow.

The flowlet table may further indicate (e.g., via a Flowlet Active field or bit(s)) whether an entry in the table is associated with an active flowlet. In some embodiments, if a packet is not received for a flowlet for a particular period of time (e.g., pre-defined timeout value), the flowlet may be deemed inactive or expired. Thus, the corresponding entry may be identified (e.g., in the corresponding field or bit(s)) as inactive. However, the corresponding port may not be replaced in the table, since the port may be used to make decisions for new flowlets for that flow. In some embodiments, the identification of a flowlet (and corresponding port) as inactive may indicate that the next packet received for that flow be treated as a new flowlet. More particularly, upon receipt of a new packet for the flow, the source leaf device may select a new port (e.g. based upon a hash of the flow) if the entry indicates that the previous flowlet for that flow is inactive. However, the uplink may not be replaced in the flowlet table as long as the flowlet is active.

In some embodiments, if an uplink (e.g., the previously selected port) identified in an entry in the flowlet table is determined to be not allowed at some point, an alternate port may be chosen (e.g., via hash). The newly selected uplink may then be identified in the entry in the flowlet table. In some instances, the port in the table may not be replaced in the event that the uplink is determined to be not allowed, since this entry may be used to make decisions for new flowlets for that flow.

In the above-described example, it is assumed that there is a 1-to-1 correspondence between the flowlets and the entries in the flowlet table. However, in other embodiments, a hash on the flow (e.g., a 5-tuple), which in some implementations may be based upon inner header(s) of the packet, may be used to identify an entry in the flowlet table. As a result, there is a possibility that two or more flows will be mapped to the same entry in the flowlet table. It follows that the flowlet table would be managed differently in such embodiments. For example, if the uplink is not allowed, it may not be replaced in the flowlet table as long as the flowlet is identified as active. In this manner, reordering-free operation may be ensured when different flows collide (e.g., should the port later become allowed).

In addition, the flowlet table may also store priorities in association with the flowlets. This may enable priorities to be assigned to flowlets or a subset of packets of the corresponding flowlets. Thus, priorities may be looked up and applied as packets in the flowlets are received.

In some implementations, a pre-defined number of initial packets of a flow or a pre-defined number of initial flowlets of a flow may be prioritized. Thus, a counter may also be stored in association with each corresponding entry such that the counter is associated with the flowlet (and therefore the flow). The counter may be incremented or decremented as packets or flowlets are processed (e.g., transmitted). More particularly, when a first packet or flowlet of a flow is received, the counter associated with the entry may be initialized to a pre-defined number, HIGH_PRIO_FLOWLET_COUNT, which indicates the number of flowlets that should be given high priority for each new flow. For example, the pre-defined number may be in the range 0-14. Each time a new flowlet for the flow is received, the counter may be decremented. When the counter reaches the value of zero, the remaining flowlets in the flow may no longer be given high priority. Various embodiments for prioritizing flowlets or portions thereof are described in U.S. Provisional Application No. 61/900,277, entitled "Dynamic Flowlet Prioritization," by Attar et al, filed on Nov. 5, 2013, which is incorporated herein by reference in its entirety and for all purposes.

In embodiments where it is possible that two or more flows may correspond to the same entry in the flowlet table, the prioritization of flowlets may have a different effect on network traffic. More particularly, rather than prioritizing a pre-defined number of flowlets for a given flow, it may result in prioritizing the pre-defined number of flowlets among two (or more) different flows.

FIG. 6D is a diagram illustrating an example egress table that may be maintained by a leaf device acting as a destination leaf device for packets received from a source leaf device maintaining the ingress table shown in FIG. 6A. As shown in this example, the feedback metrics maintained by a destination leaf device in its Egress Congestion State Table for a given source leaf device (represented by a source TEP) may mirror the remote congestion metrics that were received from the destination leaf device, as maintained by the source leaf device in its Ingress Congestion State Table, as shown in FIG. 6A.

Figure 7A:
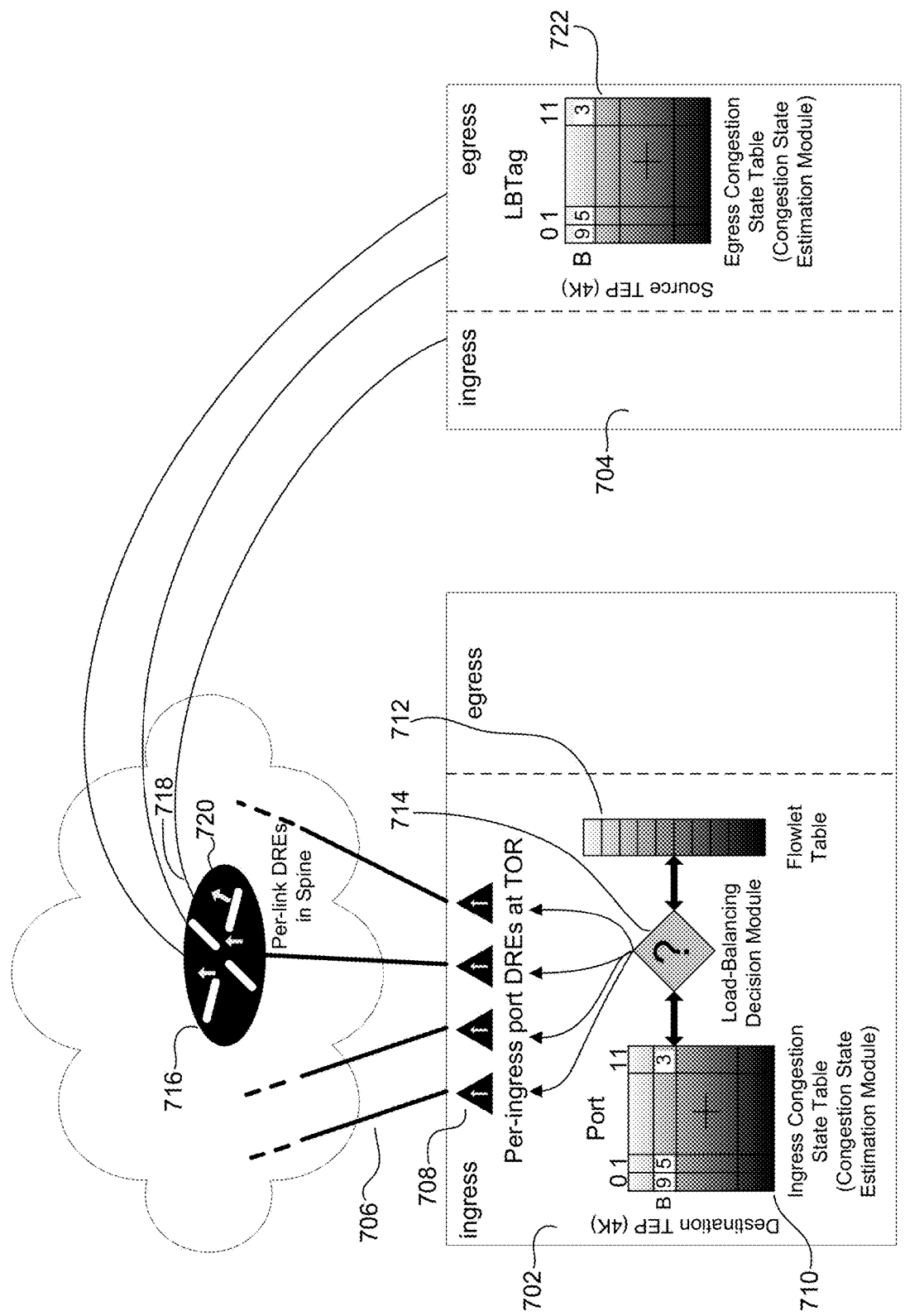
FIG. 7A is a diagram illustrating an example system that may be used to implement the disclosed embodiments.

FIG. 7A is a diagram illustrating an example system that may implement the disclosed embodiments. As shown in this example, a leaf device acting as a source leaf device 702 may send a packet to a destination leaf device 704. The source leaf device 702 may periodically generate a local congestion metric for each of the plurality of uplinks 706 of the source leaf device 704. Alternatively, local congestion metrics may be generated on an as-needed basis. This may be accomplished via a mechanism that tracks the number of bytes or packets that are transmitted via the corresponding one of the plurality of uplinks 706. For example, the mechanism may track a number of packets or bytes transmitted via a corresponding one of the plurality of uplinks within a particular period of time and/or may track a rate of transmission of packets or bytes via the corresponding uplink. The mechanism may be a single mechanism that generates the local congestion metric for all uplinks of the source leaf device 704 or, alternatively, may include a separate dedicated mechanism for each of the uplinks of the source leaf device 704.

In some embodiments, each of the plurality of uplinks of the source leaf device 704 may include a dedicated Discounted Rate Estimator (DRE) module 708 that generates the local congestion metric for the corresponding uplink. The DRE module 708 may track the number of packets or bytes sent on the corresponding port and/or measure the rate at which traffic is sent on the corresponding uplink. This rate may be compared to a capacity of the link to compute a utilization of the uplink. The utilization may be quantized to derive the local congestion metric for the uplink. For example, the utilization may be quantized to 3 bits. In some implementations, a decay factor may be implemented to decrease the local congestion metric over time. To obtain the local congestion metrics, the leaf device may query the DRE modules of the corresponding ports, as appropriate.

As described above, the local congestion metric may be generated based, at least in part, upon a number of packets or bytes transmitted via the corresponding uplink within a particular period of time. In addition, the local congestion metric may be based, at least in part, upon a rate at which packets or bytes are transmitted via the corresponding uplink. For example, as described above, the rate at which traffic is sent on the corresponding uplink may be compared to a capacity of the link to compute a utilization of the uplink. Thus, in some implementations, the local congestion metric may be generated based, at least in part, upon the utilization of the uplink.

In some embodiments, the local congestion metric may be a numerical value between 0 and 7 that indicates a level of local congestion at the corresponding uplink. For example, a number of 7 may indicate a high level of local congestion at the uplink, while a number of 0 may indicate little or no congestion at the uplink.

The leaf device 702 may maintain an Ingress Congestion State Table 710 such as that described above with reference to FIG. 6A. As described above, the Ingress Congestion State Table 710 may store, for each destination leaf device (e.g., destination TEP), a remote congestion metric for each uplink of the leaf device 702. The remote congestion metric may provide a measure of congestion experienced by packets sent through the corresponding port on remote links in the fabric.

A Congestion State Estimation Module may monitor the state of congestion to other leaf devices on a per-uplink basis. In addition, the Congestion State Estimation Module may update the Ingress Congestion State Table 710 according to congestion state feedback received from other leaf devices. More particularly, the remote congestion metrics in the Ingress Congestion State Table 710 may include values obtained or derived from feedback piggybacked on packets transmitted in the reverse direction by the destination leaf devices.

In addition, the leaf device 702 may maintain a Flowlet Table 712 such as that described above with reference to FIG. 6C. In this manner, the leaf device 702 may keep track of flowlets and their corresponding (e.g., current) port.

In some embodiments, forwarding may identify a set of uplinks that can be used to transmit the packet. For example, an ALLOWED PORTS bit-map may be generated that identifies each of the ports that can be used to transmit the packet. The leaf device 702 may select the "best" port among the allowed ports—the one through which the packet is most likely to experience the lowest level of congestion on route to its destination. This may be performed by a Load Balancing Decision Module 714, which makes decisions for each new flowlet.

The Load Balancing Decision Module 714 may make perform flowlet detection. In some embodiments, flowlets may be detected using the Flowlet Table 712, as described herein. When a new flowlet is detected, the Load Balancing Decision Module 714 may select one of the uplinks of the leaf device 702 via which to transmit the flowlet. This may be accomplished based, at least in part, on the current (or most recent) congestion state of the paths originating at the uplinks (e.g., of the allowed uplinks) of the leaf device 702, as indicated in the Ingress Congestion State Table 710. The Ingress Congestion State Table 710 stores the "remote" congestion metrics corresponding to the uplinks, as described herein.

Load balancing decisions may be made based, at least in part, upon on one or more congestion metrics for each of the allowed uplinks (e.g., each of two or more of the uplinks) of the leaf device 702. In some embodiments, the load balancing decisions may be made based upon the congestion metrics for each of the uplinks of the leaf device 702. For each of the two or more uplinks of the leaf device, the congestion metrics may include a local congestion metric and/or remote congestion metrics. In some embodiments, each of the metrics is a numerical value. For example, each of the metrics may be an integer in the range 0-9. In some implementations, 0 may be reserved to indicate an invalid value.

In accordance with various embodiments, the uplink with the lowest "overall" congestion metric may be selected. In some implementations, the overall congestion metric is the maximum of the local and remote congestion metrics for the port.

When an uplink is selected by the Load Balancing Decision Module 714, packets in the flowlet may be transmitted via the selected uplink. A packet in the flowlet may be intercepted and forwarded by one or more spine devices 716.

Each spine device 716 may periodically generate a local congestion metric for each of its downlinks 718. Alternatively, local congestion metrics may be generated on an as-needed basis. The local congestion metric may be generated in a similar manner to that set forth above with respect to the leaf device 702. More particularly, a per-spine or per-link mechanism may be implemented to generate the local congestion metric(s). For example, each port of each spine device in a given spine tier may have a per-link DRE module 720. Thus, the local congestion metric of a port of the spine device may indicate a link utilization of the port.

For spine devices, the computation of the local congestion metric and the implementation of the DRE module may vary slightly from the implementation for leaf devices. More particularly, local congestion metrics and corresponding DREs generally measure traffic (e.g., congestion and/or link utilization) being transmitted (e.g., going out) on corresponding ports. However, in some implementations, local congestion metrics and corresponding DREs may also measure traffic (e.g., congestion and/or link utilization) being received (e.g., coming in) on one or more corresponding ports. This may be desirable, for example, for internal links of spine devices that connect to other spine devices, to compensate for other spine devices that do not implement DRE modules or similar functionality to compute local congestion metrics. Therefore, in some instances, a packet may be updated by two DREs—one for an input port of the spine device and one for an output port of the spine device.

In some embodiments, it is possible to deactivate DRE modules individually. As a result, the CE value in a CE field of a packet header would not be modified when going out (or being received) on a corresponding link. For example, it may be desirable to deactivate DREs on internal links of spine devices (e.g., connecting to other spine devices).

When the spine device 716 receives a packet, the spine may identify a downlink of the spine via which to send the packet. In some implementations, the spine device 716 implements a mechanism such as ECMP to select a downlink (e.g., by performing a hash on contents of an outer frame header). As a result, the spine device 716 may select the downlink independent of its local congestion metrics. In other implementations, the spine device 716 may obtain the local congestion metrics of at least a subset of its downlinks 718 (or each of the downlinks 718 that is "possible" for sending packets to the destination leaf device). This may be accomplished, for example, by querying the DRE modules of the corresponding links. Thus, the spine may select the uplink having the lowest local congestion metric.

The spine device 716 may decide whether to modify a value in the CE field of the packet header prior to forwarding the packet to the destination leaf device. More particularly, once the spine device 716 selects one of its downlinks via which to send the packet, the spine device may compare the local congestion metric for the selected downlink with the value in the CE field of the packet header. If the local congestion metric of the selected downlink is larger than the value in the CE field, the spine device 716 may replace the value in the CE field with the local congestion metric. However, if the local congestion metric is not larger than the value in the CE field of the packet header, the spine device 716 may choose not to modify or replace the value in the CE field of the packet header. As a result, the value in the CE field may indicate a maximum link utilization of the packet along its path. In this manner, the value in the CE field of the packet header may designate the maximum level of remote congestion experienced as the packet traverses through the fabric after the packet is transmitted by the leaf device 702. In other embodiments, the spine device 716 may modify the value in the CE field according to other algorithms. For example, the value in the CE field of the packet header may designate the total level of remote congestion experienced as the packet traverses through the fabric after the packet is transmitted by the leaf device 702. Thus, the spine device 716 may replace the value in the CE field with a sum of the local congestion metric and the (previous) value in the CE field.

As described above, a leaf device acting as a destination leaf device 704 may maintain an Egress Congestion State Table 722 such as that described above with reference to FIG. 6B. When the destination leaf device receives the packet, it may update its Egress Congestion State Table 722 based, at least in part, upon the value in the CE field of the packet in association with the LBT tag provided in the packet header. The leaf device 704 may opportunistically provide feedback to the source leaf device 702 by providing the value obtained from the CE field and the LBT tag, as stored in the Egress Congestion State Table 722, in a header of a reverse transmitted packet addressed to the leaf device 702.

A system such as that shown in FIG. 7A may be implemented to efficiently load balance traffic across the fabric in an end-to-end fashion. At any time, traffic may be distributed across the fabric in a manner that is dependent on the current state of congestion in the fabric.

Although source and destination leaf devices are shown in this example as having separate functionalities, it is important to note that each leaf device may operate as both a source and destination leaf device. As a result, each leaf device may be configured to operate as both a source leaf device and a destination leaf device. Accordingly, the blocks shown in this example are intended to simplify the illustration.

Figure 7B:
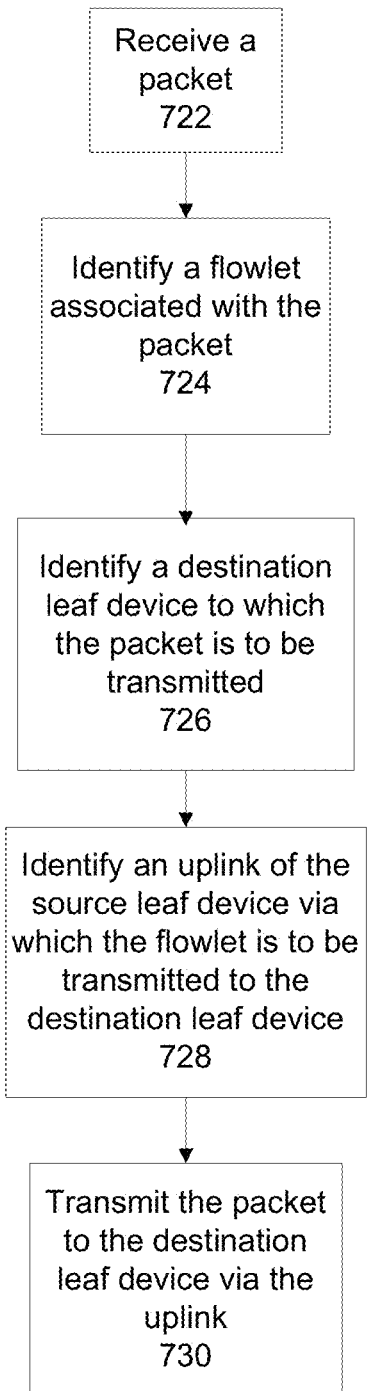
FIG. 7B is a process flow diagram illustrating an example method of processing a packet being transmitted by a leaf device in accordance with various embodiments.

FIG. 7B is a process flow diagram illustrating an example method of processing a packet being transmitted by a leaf device in accordance with various embodiments. When a source leaf device receives a packet at 722, it may identify a flowlet associated with the packet at 724. More particularly, the source leaf device may determine whether the flowlet is a new flowlet.

A new flowlet may be initiated or detected if the packet is associated with a different flow from the previously received packet. As described herein, a flow may be identified by one or more fields from packet header(s). In some embodiments, the flow may be identified by a 5-tuple (e.g. Source IP address, Destination IP address, Source Port, Destination Port, and Protocol). For example, where the packet is a VXLAN frame, the flow may be identified from inner VXLAN packet header(s).

Alternatively, if the packet is associated with the same flow as the previously received packet, a new flowlet may be initiated or detected if the amount of time that has lapsed between the time of receipt of the packet and the time of receipt of the immediately preceding packet in the flow is at least a pre-defined period of time. Thus, the source leaf device may ascertain the amount of time that has lapsed between the time of receipt of the packet and the time of receipt of the previous packet in the flow (e.g., based upon time stamps).

The source leaf device may identify a destination leaf device to which the packet is to be transmitted at 726. For example, the source leaf device may obtain a destination address of an end device from a header of the packet and look up a location of the end device (e.g., a destination leaf device) to which the packet is to be transmitted.

The source leaf device may identify an uplink of the source leaf device via which the flowlet is to be transmitted to the destination device at 728. More particularly, the source leaf device may identify an uplink of the source leaf device based, at least in part, upon whether the flowlet is a new flowlet.

The source leaf device may then select the uplink of the source leaf device via which to transmit the flowlet to the destination leaf device according to whether the flowlet is a new flowlet. More particularly, if the source leaf device determines that the flowlet is not a new flowlet, the source leaf device may simply identify the uplink from the pertinent entry in the flowlet table. However, in some implementations, even if the packet is determined to be part of an existing (e.g., active) flowlet, it is possible that the uplink identified in the flowlet table may not be an allowed port (e.g., as supplied by a forwarding decision). This may occur if a status of the uplink has changed since the flowlet started or in case of collisions in the flowlet table. In either case, a new uplink may be selected (e.g., from a set of allowed ports). More particularly, the new uplink may be selected via a mechanism such as that described herein (e.g., based upon congestion metric(s)) or a standard mechanism such as ECMP.

If the source leaf device determines that the flowlet is a new flowlet, the source leaf device may select an uplink of the source leaf device via which to transmit the flowlet to the destination leaf device. However, there may be a bias toward a previously selected port for a flow associated with the flowlet. If the congestion metric(s) associated with a newly selected port do not provide a significant improvement over the congestion metric(s) associated with the previously selected port (for a previous flowlet) for the flow (e.g., an improvement of the metric(s) by more than a particular defined amount), the previously selected port as identified from the flowlet table may be used. Accordingly, it may be desirable to prevent splitting flowlets of a flow across multiple paths unless there is expected to be a significant improvement in load balancing. The source leaf device may then transmit the packet to the destination leaf device via the uplink at 730.

FIG. 8A is a process flow diagram illustrating an example method of processing a new flowlet by a leaf device acting as a source leaf device in accordance with various embodiments. A source leaf device may identify (e.g., detect) a flowlet associated with a flow at 802, where the flowlet includes one or more packets. The source leaf device may identify a destination leaf device to which the flowlet is to be transmitted at 804.

The source leaf device may select one of two or more paths via which to transmit the flowlet to the destination leaf device at 806. More particularly, each of the paths may be associated with a different one of two or more of a plurality of uplinks of the source leaf device. Thus, the selection of one of the paths may include selecting one of the uplinks of the source leaf device.

The source leaf device may select one of the paths based, at least in part, upon a level of congestion associated with each of the paths. More particularly, the two or more paths may consist of those paths that are identified as "allowable" or possible paths to the destination leaf device. For example, the two or more uplinks that are allowable (e.g., selectable) may be at least a subset of the plurality of uplinks of the source leaf device. The level of congestion associated with each of the paths, or corresponding uplink, may be ascertained via one or more congestion metrics associated therewith. In this manner, the source leaf device may select the path that is likely to have less congestion than other possible paths.

It is possible to balance traffic based solely upon local congestion experienced at the links of the source leaf device. However, in accordance with various embodiments, the congestion experienced between the source leaf device and the destination leaf device after the packet has been transmitted may also be tracked to assist in the path selection process.

In accordance with various embodiments, the congestion metrics associated with a particular uplink may include a local congestion metric associated with the uplink. The local congestion metric may be automatically and periodically updated based, at least in part, upon a number of bytes or packets that have been transmitted via the uplink. In addition, the congestion metrics may include a remote congestion metric associated with the corresponding uplink. The remote congestion metric may be updated based upon feedback received from other leaf devices, as will be described in further detail below.

The source leaf device may maintain (e.g., via one or more tables), for each one of a plurality of destination leaf devices, for each one of a plurality of uplinks of the source leaf device, a remote congestion metric indicating a level of congestion associated with the corresponding one of the uplinks of the source leaf device. The remote congestion metric may indicate a level of congestion that has been experienced by packet(s) traversing the corresponding path from the source leaf device (and corresponding uplink) to the destination leaf device. The local congestion metric may indicate a local level of congestion that is local to the corresponding uplink of the source leaf device.

The source leaf device may perform a look up in its table(s) to ascertain, for the destination leaf device, a remote congestion metric associated with each one of the two or more possible (e.g., allowable) uplinks of the plurality of uplinks of the source leaf device. In addition, the source leaf device may perform a look up or query to ascertain the local congestion metric associated with each of the two or more possible uplinks of the plurality of uplinks of the source leaf device. The source leaf device may select one of the two or more uplinks based, at least in part, upon the local congestion metric and/or the remote congestion metric associated with each of the two or more uplinks. More particularly, the uplink with the lowest "overall" congestion metric may be selected. In some implementations, the overall congestion metric is the maximum of the local and remote congestion metrics for the port. In other implementations, the overall congestion metric is the total of the local and remote congestion metrics for the port.

In some embodiments, there may be a bias toward the previously selected uplink (current uplink uplink) for a prior flowlet of the flow for which the current flowlet is being handled. The source leaf device may compare at least one of the congestion metrics for each of the two or more of the plurality of uplinks of the source leaf device with at least one of the congestion metrics associated with a previously selected one of the plurality of uplinks. For example, the source leaf device may compare the highest of the local congestion metric and the remote congestion metric for each of the two or more possible uplinks with the maximum congestion metric (e.g., the maximum of the local congestion metric and the remote congestion metric) associated with the previously selected uplink. The previously selected uplink may be selected if another one of the possible uplinks does not provide at least a minimum amount of improvement over the previously selected uplink.

The source leaf device may append a header such as that described herein to at least one of the packets of the flowlet (or modify existing header(s)) prior to transmitting the packet(s) in the flowlet. In some embodiments, the source leaf device may encapsulate the packets with header(s) or, alternatively, modify existing header(s), such that the header(s) include a first tag identifying the selected uplink and a congestion experienced field including a value indicating a level of congestion associated with the selected uplink. The source leaf device may initialize the value to zero or, alternatively, provide a local metric in the congestion experienced field, where the local metric indicates a level of congestion that is local to the selected uplink.

In addition, the source leaf device may check an Egress Congestion State Table such as that described above with reference to FIG. 6B to determine whether it has feedback metric(s) pertaining to link(s) of the destination leaf device to transmit to the destination leaf device (e.g., that have not yet been transmitted to the destination leaf device). For example, the source leaf device may check entries pertaining to the destination leaf device in its Egress Congestion State Table. If the source leaf device has feedback metric(s) to transmit to the destination leaf device, the source leaf device may provide congestion state feedback to the destination leaf device in at least one of the packets of the flowlet. More particularly, newly appended or pre-existing header(s) may include a second tag identifying one of a plurality of uplinks of the destination leaf device and a feedback metric, which may indicate a level of congestion (e.g., maximum level of congestion) experienced between the identified uplink of the destination leaf device and the source leaf device. Therefore, through a single header, the source leaf device may provide feedback to another leaf device, as well as "solicit" feedback for use in its own load balancing.

The source leaf device may transmit the packet(s) in the flowlet via the selected one of the two or more paths at 808. At a later point in time, the source leaf device may receive feedback with respect to at least one of the packets in the flowlet. This feedback may be received in a reverse packet received from the destination leaf device.

FIG. 8B is a process flow diagram illustrating an example method of processing a reverse packet received by the leaf device of FIG. 8A in accordance with various embodiments. As shown at 810, the source leaf device may receive a packet from the destination leaf device, where the packet header includes congestion state feedback. The congestion state feedback may include information pertaining to the remote congestion metric associated with a specified uplink of the source leaf device. For example, the specified uplink may be the uplink selected at 806 of FIG. 8A. More particularly, the information may include a FB LBT identifying the uplink of the source leaf device and a feedback metric indicating the remote congestion metric associated with the uplink. As described above, the remote congestion metric may indicate a maximum level of congestion experienced between the selected uplink of the source leaf device and the destination leaf device. Specifically, the remote congestion metric may indicate a maximum level of congestion experienced by the packet(s) transmitted from the selected uplink of the source leaf device to the destination leaf device, as referred to at 808 of FIG. 8A.

The source leaf device may then update the remote congestion metric associated with the uplink of the source leaf device at 812 based, at least in part, upon the congestion state feedback. More particularly, the source leaf device may update the pertinent entry (corresponding to the uplink and the destination leaf device) in its Ingress Congestion State Table based, at least in part, upon the feedback metric. The source leaf device may store the recently received feedback metric or may update its previously stored remote congestion metric based, at least in part, upon the received feedback metric. For example, the source leaf device may generate and store an updated remote congestion metric by calculating and storing an average (e.g., weighted average) of the previously stored remote congestion metric and the recently received feedback metric. Alternatively, the source leaf device may choose to update the pertinent entry in its Ingress Congestion State Table only if the feedback metric is greater than the value already stored in the entry in the Ingress Congestion State Table. In this manner, the source leaf device of FIG. 8A may record congestion state feedback as it is received from other leaf devices.

As will be described in further detail below, the feedback metric may originate from another remote link such as a spine device or leaf device. The feedback metric may correspond to congestion present at the source leaf device (e.g., where the source leaf device initially provides its local congestion metric in the CE field of the packet), a spine device, and/or the destination leaf device.

The packet header or, alternatively, another header of the packet, may further include a LBT field identifying one of a plurality of uplinks of the destination leaf device and a CE field including a value indicating a level of congestion (e.g., maximum level of congestion) experienced by the packet between the identified uplink of the destination leaf device and the source leaf device (e.g., after it was transmitted from the uplink of the destination leaf device to the source leaf device). The source leaf device may then update the feedback metric in the appropriate entry in an Egress Congestion State Table such as that shown and described with reference to FIG. 6B. More particularly, the source leaf device may store the value obtained from the CE field of the packet or update the value of the feedback metric already stored in the table entry based, at least in part, upon the recently received CE value. For example, the source leaf device may generate and store an updated feedback metric by calculating and storing an average (e.g., weighted average) of the previously stored feedback metric and the recently received CE value. Alternatively, it may choose to store the recently received CE value only if it is greater than the value of the feedback metric already stored in the Congestion State Table for the uplink of the destination leaf device.

Figure 9:
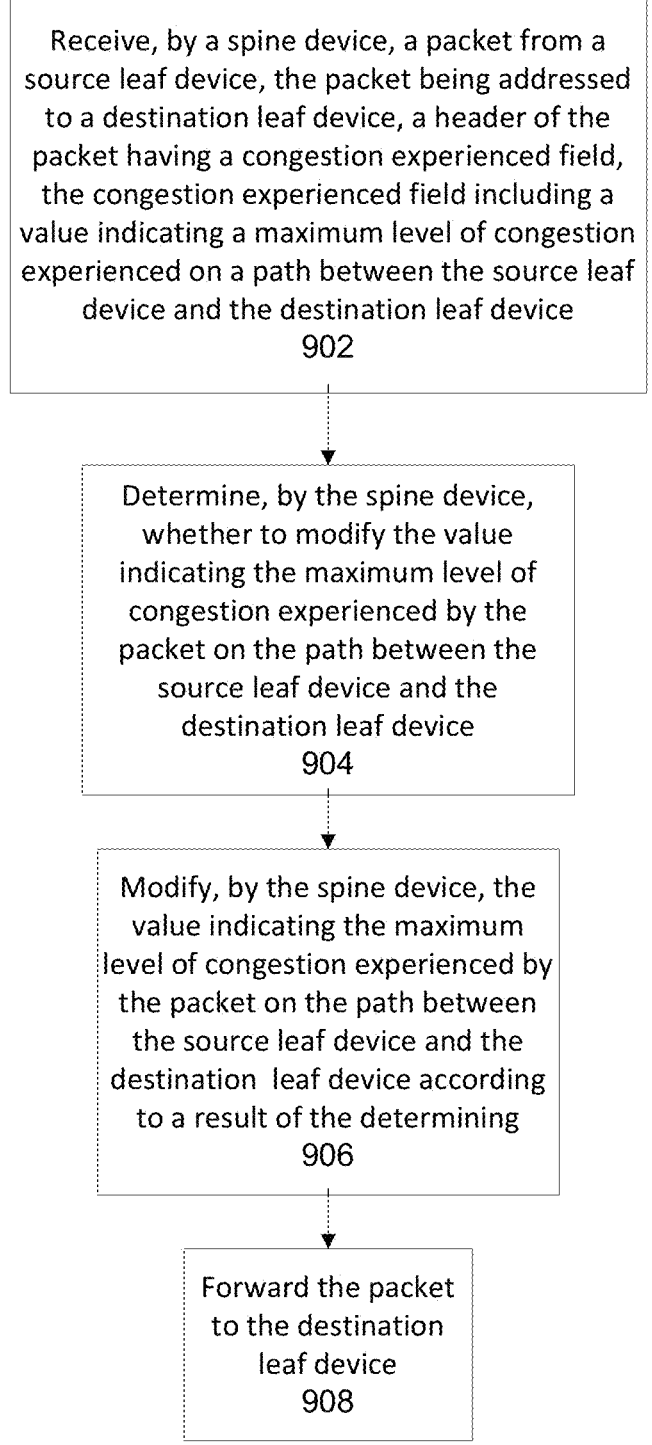
FIG. 9 is a process flow diagram illustrating an example method of processing a packet at a spine device in accordance with various embodiments.

FIG. 9 is a process flow diagram illustrating an example method of processing a packet at a spine device in accordance with various embodiments. A spine device may receive a packet from a source leaf device at 902, where the packet is addressed to a destination leaf device. A header of the packet may have a CE field including a value indicating a level of congestion (e.g., maximum level of congestion) experienced by the packet on a path between the source leaf device and the destination leaf device, as described above with reference to FIG. 8A. As described above, the packet header may further include a LBT field specifying a LBT identifying one of a plurality of uplinks of the source leaf device from which the packet was transmitted. In addition, the packet header (or a second packet header) may include a FB LBT field including a FB LBT identifying one of a plurality of uplinks of the destination leaf device and a FB metric field including a feedback metric indicating a level of congestion (e.g., maximum level of congestion) experienced by packet(s) that have been transmitted from the one of the plurality of uplinks of the destination leaf device to the source leaf device.

The spine device may modify the value in the CE field based, at least in part, upon the local congestion metric associated with the pertinent downlink of the spine device and the previous value in the CE field. More particularly, the spine device may determine at 904 whether to modify the value in the CE field. The value in the CE field may indicate the maximum level of congestion experienced by the packet on the path between the source leaf device and the destination leaf device. Thus, the spine device may ascertain a maximum level of congestion experienced at the spine device based, at least in part, upon a level of congestion experienced at one of a plurality of downlinks of the spine device via which the packet is to be forwarded. For example, the spine may obtain a local congestion metric associated with the downlink of the spine device (e.g., from a corresponding DRE module). The spine device may compare the maximum level of congestion experienced at the spine device (e.g., the local congestion metric) with the value obtained from the CE field.

The spine device may modify the value in the CE field that indicates the maximum level of congestion experienced on the path between the source leaf device and the destination leaf device according to a result of the determining at 906. More particularly, the spine device may choose to modify the value such that the value in the CE field of the packet header is replaced with the local congestion metric of the downlink of the spine device if the local congestion metric is greater than the value in the CE field of the packet header. Alternatively, the spine device may modify the value in the CE field of the packet header according to another algorithm. The spine device may then forward the packet to the destination leaf device at 908.

Figure 10:
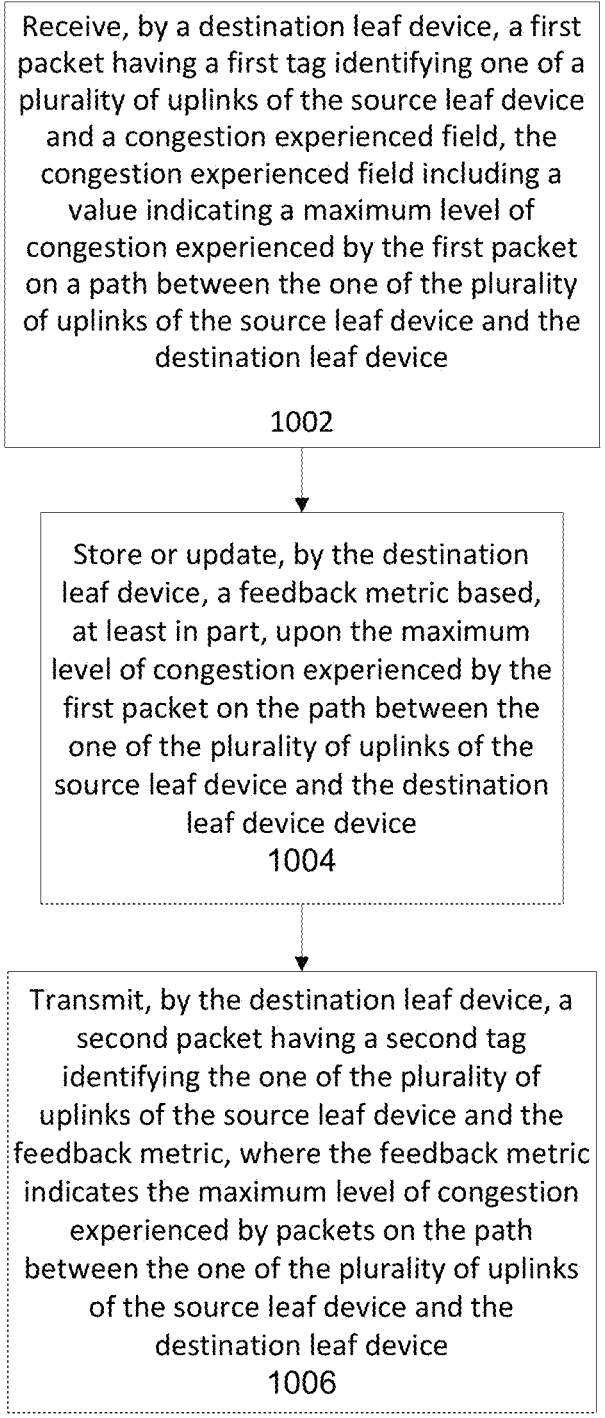
FIG. 10 is a process flow diagram illustrating an example method of processing a packet at a leaf device acting as a destination leaf device in accordance with various embodiments.

FIG. 10 is a process flow diagram illustrating an example method of processing a packet at a leaf device acting as a destination leaf device in accordance with various embodiments. A destination leaf device may receive a first packet at 1002 that has been transmitted by a source leaf device. The first packet (e.g., a header of the first packet) may include a first tag identifying one of a plurality of uplinks of the source leaf device and a CE field, where the CE field includes a value indicating a level of congestion (e.g., maximum level of congestion) experienced by the first packet on a path between the uplink of the source leaf device and the destination leaf device. The maximum level of congestion may be due, at least in part, to congestion present at the source leaf device and/or the spine device.

The destination leaf device may transmit feedback pertaining to the level of congestion (e.g., maximum level of congestion) experienced by the first packet (and possibly other packet(s)) to the source leaf device. However, in order to conserve network bandwidth, the destination leaf device may be piggybacked on packets transmitted in the reverse direction. Since a packet being transmitted in the reverse direction may not be immediately available, the destination leaf device may store the value from the CE field (or otherwise update a feedback metric based, at least in part, upon the value from the CE field) while it waits for an opportunity to send this value as feedback to the source leaf device.

The destination leaf device may store or update a feedback metric based, at least in part, upon the value from the CE field indicating the level of congestion (e.g., maximum level of congestion) experienced by the first packet on the path between the uplink of the source leaf device and the destination leaf device at 1004. More particularly, the destination leaf device may store or update the feedback metric in the pertinent entry in an Egress Congestion State Table such as that shown and described above with reference to FIG. 6B based, at least in part, upon the level of congestion (e.g., maximum level of congestion) experienced by the first packet and/or a previously stored feedback metric value from the entry in the Egress Congestion State Table. For example, the maximum level of congestion obtained from the first packet or an average (e.g., weighted average) of the newly received CE value and the previous feedback metric may be stored in association with both the source leaf device and the identified uplink of the source leaf device. This may result in a replacement of a previous feedback metric value. Accordingly, the feedback metric that is stored may indicate a level of congestion (e.g., maximum or average level of congestion) experienced by packets on route from the identified uplink of the source leaf device and the destination leaf device.

In some embodiments, the maximum level of congestion may be stored only if it is greater than the feedback metric already stored in the pertinent entry of the Egress Congestion State Table. As a result, the value of the feedback metric in the Egress Congestion State Table may be periodically updated (e.g., replaced) if the more recently received CE value is greater than the previously stored feedback metric value. In other embodiments, the value of the feedback metric in the pertinent entry in the Egress Congestion State Table may be updated based, at least in part, upon the previously stored feedback metric value and/or the newly received CE value. For example, the feedback metric may be updated to an average (e.g., a weighted average) of the current, previously stored value of the feedback metric in the table and the recently received value of the CE field. In addition, a change value, time and/or age field may be updated to indicate that the corresponding feedback metric value has been changed and/or to indicate a recency of the change. In this manner, the destination leaf device may maintain and update, for each one of a plurality of source leaf devices, for each one of the plurality of uplinks of the corresponding source leaf device, a feedback value indicating the level of congestion (e.g., maximum level of congestion) experienced on the path between the uplink of the source leaf device and the destination leaf device.

In addition, the header of the first packet (or another header of the first packet) may include a FB LBT field and a FB metric field, where the FB LBT field includes a FB LBT identifying one of a plurality of uplinks of the destination leaf device and the FB metric field includes a feedback metric indicating the level of congestion (e.g., maximum level of congestion) experienced by another packet (or multiple packets) on a path from the identified uplink of the destination leaf device to the source leaf device. In some embodiments, the FB LBT is used in conjunction with the destination IP address from the first packet to determine the uplink for which the feedback has been provided. Thus, the destination leaf device may parse the pertinent header(s) or otherwise obtain each feedback metric and the corresponding uplink identifier from the header(s) of the first packet.

The destination leaf device may store or otherwise update a remote congestion metric in association with the identified uplink in an Ingress Congestion State Table such as that shown and described above with reference to FIG. 6A based, at least in part, upon a received feedback metric.

In some embodiments, the feedback metric may be stored as a remote congestion metric in association with the identified uplink of the destination leaf device and the source leaf device. This may result in a replacement of a previous remote congestion metric value. Of course, where a zero feedback metric value indicates an invalid feedback message, the destination leaf device may choose not to update its Ingress Congestion State Table.

In some embodiments, the feedback metric may be stored only if it is greater than the remote congestion metric already stored in the pertinent entry of the Ingress Congestion State Table. As a result, the value of the remote congestion metric in the Ingress Congestion State Table may be periodically replaced if the more recently received feedback metric value is greater than the previously stored remote congestion metric value. In other embodiments, the value of the remote congestion metric in the pertinent entry in the Ingress Congestion State Table may be updated based, at least in part, upon the previously stored remote congestion metric value and/or the newly received feedback metric value. For example, the remote congestion metric may be updated to an average (e.g., a weighted average) of the current value of the remote congestion metric in the table and the recently received value of the remote congestion metric. In addition, a change value, time and/or age field may be updated to indicate that the corresponding remote congestion metric value has been changed and/or to indicate a recency of the change. In this manner, the destination leaf device may maintain and update remote congestion metric values for its uplinks with respect to a plurality of source leaf device.

When a second packet is to be sent in the reverse direction, the destination leaf device may first determine whether it has any feedback to provide to the source leaf device. More particularly, prior to transmitting the second packet, the destination leaf device may look up the source leaf device to determine whether it has any feedback metrics to transmit to the source leaf device. For example, the destination leaf device may examine its Egress Congestion State Table for feedback metrics for the source leaf device (e.g., that have not yet been transmitted to the source leaf device). Specifically, the destination leaf device may examine the entries for each of the uplinks of the source leaf device in the Egress Congestion State Table.

In some implementations, entries in the Egress Congestion State Table may further indicate a time that entries (and corresponding feedback metrics) were most recently updated or, alternatively, may indicate an age of the feedback metric. For example, an age or time stamp may be stored in association with each feedback metric. In addition, a change value (e.g., bit) may be stored in association with each feedback metric to indicate whether the metric has changed since the last time it was transmitted back to the source leaf device. This may enable the destination leaf device to select an entry for one of the uplinks of the source device for which feedback should be transmitted. For example, the destination leaf device may choose to send the feedback metric for the entry that has been most recently changed and that has not already been transmitted back to the source leaf device. Moreover, in some embodiments, stale feedback metric values may be aged out.

In this example, the destination leaf device chooses to send feedback regarding the uplink of the source leaf device identified in the first packet. However, the destination leaf device may choose to send feedback regarding any of the uplinks of the source leaf device. Moreover, although the examples described herein pertain to feedback for a single uplink of the source leaf device, in some embodiments, the destination leaf device may send feedback for two or more uplinks of the source leaf device (e.g., in one or more packet). This may be accomplished, for example, by implementing existing header(s) or appending additional header(s), where the header(s) include fields such as that described above with reference to FIG. 5B.

Upon retrieving the feedback metric for an uplink of the source leaf device from the pertinent entry in its Egress Congestion State Table, the destination leaf device may encapsulate the second packet (e.g., by appending a header to the second packet) or use an existing header of the second packet, wherein the header of the second packet includes a FB LBT field identifying an uplink (e.g., the previously selected uplink as identified in the first packet) of the source leaf device and a FB metric field specifying the feedback metric indicating the level of congestion (e.g., maximum level of congestion) experienced by at least one packet (e.g., the first packet) on its path between the identified uplink of the source leaf device and the destination leaf device.

In addition to providing feedback to the source leaf device, the destination leaf device may also operate as a source leaf device as described above with respect to FIGS. 8A and 8B. More particularly, the header of the second packet (or another header of the second packet) may include a LBT field specifying a LBT identifying one of a plurality of uplinks of the destination leaf device and a CE field including a value indicating a level of congestion (e.g., maximum level of congestion) experienced by the second packet on a path between the identified uplink of the destination leaf device and the source leaf device. The destination leaf device may initialize the value in the CE field with a value of zero or, alternatively, may provide a local congestion metric in the congestion experienced field, where the local congestion metric indicates a level of congestion that is local to the identified uplink of the destination leaf device.

The destination leaf device may then transmit the second packet to the source leaf device at 1006. The second packet may be processed upon receipt as a packet transmitted by a source leaf device, as described herein. More particularly, the source leaf device, upon receiving the second packet, may operate as a destination leaf device as described with reference to FIG. 10.

It is important to note that the headers shown and described with reference to FIGS. 5A-5C may be existing headers or newly appended headers of packets that are already being transmitted in the fabric. In this manner, congestion metrics and feedback metrics may "piggyback" on packets that are already being transmitted in the network. As a result, the disclosed embodiments may enable load balancing through the use of congestion metrics without having a significant negative impact on the network bandwidth.

While the disclosed embodiments may be applied to all packets sent to the fabric, there may be some packets to which the disclosed embodiments are not applied. For example, "transit packets" (packets that arrive from the fabric and are sent back into the fabric) may be treated differently from other packets. In such instances, a leaf device may operate similarly to a spine device, and simply modify the value in the CE field, as described herein. For example, where its local congestion metric is larger than the value in the CE field, the leaf device may replace the value with its local congestion metric. Of course, the value in the CE field may be modified in another manner and/or according to a different algorithm.

Moreover, while various leaf devices are referred to in the examples described above as source leaf devices or destination leaf devices, these labels are merely used to simplify the description. Thus, it is important to note that each leaf device may operate as both a source leaf device and a destination leaf device. Furthermore, although the examples set forth herein are described with reference to source or destination leaf devices operating in a leaf-spine network architecture, the disclosed embodiments may also be applied to other network devices capable of operating as sources or destinations within a network fabric. Similarly, operations described with reference to spine devices may also be performed by a network device within a network fabric.

The disclosed embodiments may be implemented in one or more network devices within a network such as that described herein. Within a leaf-spine network, the disclosed embodiments may be implemented in one or more leaf network devices and/or one or more spine network devices within one or more spine tiers, in accordance with various embodiments.

FIG. 11 illustrates an example of a network device that may be configured to implement various embodiments. Network device 1500 may include one or more Application Specific Integrated Circuits (ASICs) 1502. The ASICs 1502 may have interfaces 1504, which may include ports appropriate for communication with the appropriate media and protocols. The ASICs 1502 may perform at least some of the functions of the logic described herein. In addition, a master central processing unit (CPU) 1506 may perform other functions such as routing computations, network diagnostics, security functions, etc.

The interfaces 1504 are typically provided as interface cards (not shown to simplify illustration), which may be referred to as "line cards". Generally, the interfaces 1504 control the sending and receiving of packets over the network and may also support other peripherals used with the network device 800. The communication path between interfaces/line cards may be bus based or switch fabric based (such as a cross-bar). Among the interfaces that may be provided are Fibre Channel ("FC") interfaces, Ethernet interfaces, frame relay interfaces, cable interfaces, Digital Subscriber Line (DSL) interfaces, token ring interfaces, and the like. In addition, various very high-speed interfaces may be provided, such as fast Ethernet interfaces, Gigabit Ethernet interfaces, Asynchronous Transfer Mode (ATM) interfaces, High-Speed Serial Interfaces (HSSI), Packet over Sonet (POS) interfaces, Fiber Distributed Data Interfaces (FDDI), Asynchronous Serial Interfaces (ASI)s, DigiCable Headend Expansion Interfaces (DHEI), and the like.

When acting under the control of the ASICs 1502, in some implementations of the invention the CPU 806 may be responsible for implementing specific functions associated with the functions of a desired network device. According to some embodiments, CPU 1506 accomplishes all these functions under the control of software including an operating system and any appropriate applications software.

The CPU 1506 may include one or more processors or specially designed hardware for controlling the operations of the network device 1500. The CPU 1506 may also include memory such as non-volatile RAM and/or ROM, which may be used for a variety of purposes such as, for example, caching and/or storing data, programming instructions, etc. However, there are many different ways in which memory could be coupled to the system.

Regardless of the network device's configuration, it may employ one or more memories or memory modules (such as, for example, memory block 1506) configured to store data, program instructions for the general-purpose network operations and/or other information relating to the functionality of the techniques described herein. For example, the memory block 1506 may correspond to a random access memory (RAM). The program instructions may control the operation of an operating system and/or one or more applications, for example. Because such information and program instructions may be employed to implement the systems/methods described herein, the disclosed embodiments relate to machine-readable media that include program instructions, state information, etc. for performing various operations described herein. Examples of machine-readable media include, but are not limited to, magnetic media such as hard disks and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the network device shown in FIG. 15 illustrates one specific network device, it is by no means the only network device architecture on which the disclosed embodiments can be implemented. For example, although a single ASIC is shown in FIG. 15, an architecture having two or more ASICs may also be implemented.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:

identifying, by a source leaf device, a flowlet associated with a flow, the flowlet including one or more packets;

identifying, by the source leaf device, a destination leaf device to which the flowlet is to be transmitted;

receiving, by the source leaf device, a packet from the destination leaf device, the packet including information pertaining to a remote congestion metric associated with a specified one of a plurality of uplinks of the source leaf device;

updating, by the source leaf device, the remote congestion metric associated with the specified one of the plurality of uplinks based, at least in part, upon the information pertaining to the remote congestion metric associated with the specified one of the plurality of uplinks;

ascertaining, for the destination leaf device, the remote congestion metric associated with each one of two or more of the plurality of uplinks of the source leaf device;

selecting, by the source leaf device, one of two or more paths via which to transmit the flowlet to the destination leaf device, wherein selecting the one of the two or more paths includes selecting one of the two or more of the plurality of uplinks of the source leaf device via which to transmit the flowlet, wherein selecting the one of the two or more paths is performed based, at least in part, upon one or more congestion metrics associated with each of the two or more of the plurality of uplinks of the source leaf device, the one or more congestion metrics including the remote congestion metric;

encapsulating, by the source leaf device, the one or more packets with a header, the header including a congestion-experienced field, a load-balancing tag field, a feedback load balancing tag field, and a feedback metric field, the load-balancing tag field being a generic identifier representing all of a plurality of paths for various packets or flowlets originating from a port; and transmitting the one or more packets in the flowlet via the one of the two or more paths, wherein, the remote congestion metric indicates at least one of:
1) a maximum level of congestion experienced by packet(s) transmitted from the specified one of the plurality of uplinks of the source leaf device to the destination leaf device or 2) a total level of congestion experienced along a path between a corresponding one of the plurality of uplinks of the source leaf device and the destination leaf device, the total level of congestion being a sum of congestion metrics of links along the path between the corresponding one of the plurality of uplinks of the source leaf device and the destination leaf device.

2. The method as recited in claim 1, wherein selecting, by the source leaf device, one of the two or more paths via which to transmit the flowlet to the destination leaf device comprises:
selecting one of the two or more paths based, at least in part, upon a level of congestion that has been experienced along the corresponding path from the source leaf device to the destination leaf device.

3. The method as recited in claim 1, wherein each of the two or more paths is associated with a different one of two or more of a plurality of uplinks of the source leaf device.

4. The method as recited in claim 3, further comprising:
maintaining, by the source leaf device, for each one of a plurality of destination leaf devices, for each one of the plurality of uplinks of the source leaf device, a remote congestion metric indicating a level of congestion associated with the corresponding one of the plurality of uplinks of the source leaf device.

5. The method as recited in claim 1, wherein selecting one of the two or more of the plurality of uplinks comprises:
comparing at least one of the congestion metrics for each of the two or more of the plurality of uplinks of the source leaf device with at least one congestion metric associated with a previously selected one of the plurality of uplinks.

6. The method as recited in claim 5, wherein the previously selected one of the plurality of uplinks for a previous flowlet of the flow is selected if another one of the two or more of the plurality of uplinks of the source leaf device does not provide at least a minimum amount of improvement over the previously selected one of the plurality of uplinks.

7. The method as recited in claim 1, further comprising:
ascertaining a local congestion metric associated with each one of the two or more of the plurality of uplinks of the source leaf device, the local congestion metric originating from the source leaf device, the local congestion metric indicating a local level of congestion that is local to the corresponding one of the two or more of the plurality of uplinks of the source leaf device;
wherein the one or more congestion metrics include the local congestion metric such that selecting one of the two or more paths is performed based, at least in part, upon the local congestion metric associated with each of the two or more of the plurality of uplinks of the source leaf device.

8. The method as recited in claim 7, further comprising:
updating the local congestion metric for one of the plurality of uplinks of the source leaf device, based, at least in part, upon a number of bytes or packets that have been transmitted via the corresponding one of the plurality of uplinks of the source leaf device.

9. The method as recited in claim 1, wherein the information pertaining to the remote congestion metric associated with the specified one of the plurality of uplinks originated from the destination leaf device.

10. The method as recited in claim 1, wherein the remote congestion metric indicates a maximum level of congestion experienced along a path between a corresponding one of the plurality of uplinks of the source leaf device and the destination leaf device, the header indicating the maximum level of congestion experienced between the one of the plurality of uplinks and the destination leaf device;
wherein updating, by the source leaf device, the remote congestion metric is performed based, at least in part, upon the maximum level of congestion experienced between the one of the plurality of uplinks and the destination leaf device.

11. The method as recited in claim 10, wherein the maximum level of congestion is due to congestion present at the source leaf device, a spine device, and/or the destination leaf device.

12. The method as recited in claim 1, wherein the congestion experienced field includes a value indicating the total level of congestion associated with the one of the plurality of uplinks of the source leaf device.

13. The method as recited in claim 12, wherein the value is zero.

14. The method as recited in claim 1, further comprising:
updating a first table based, at least in part, upon the maximum level of congestion experienced between the one of the plurality of uplinks of the destination leaf device and the source leaf device and a previously stored maximum level of congestion experienced between the one of the plurality of uplinks of the destination leaf device and the source leaf device; and
updating a second table based, at least in part, upon the maximum level of congestion experienced between the one of the plurality of uplinks of the source leaf device and the destination leaf device and a previously stored maximum level of congestion experienced between the one of the plurality of uplinks of the source leaf device and the destination leaf device.

15. The method as recited in claim 1, further comprising:
updating a first table based, at least in part, upon the maximum level of congestion experienced between the one of the plurality of uplinks of the destination leaf device and the source leaf device; and
updating a second table based, at least in part, upon the maximum level of congestion experienced between the one of the plurality of uplinks of the source leaf device and the destination leaf device.

16. The method as recited in claim 1, wherein the information pertaining to the remote congestion metric associated with the specified one of the plurality of uplinks originated from a spine device.

17. The method as recited in claim 1, the packet having a header including the information.

18. An apparatus, comprising:
a processor; and
a memory, at least one of the processor or the memory being configured to:
identify a flowlet associated with a flow, the flowlet including one or more packets;
identify a destination leaf device to which the flowlet is to be transmitted;
receive a packet from the destination leaf device, the packet including information pertaining to a remote congestion metric associated with a specified one of a plurality of uplinks of a source leaf device;
update the remote congestion metric associated with the specified one of the plurality of uplinks based, at least in part, upon the information pertaining to the remote congestion metric associated with the specified one of the plurality of uplinks;
ascertain, for the destination leaf device, the remote congestion metric associated with each one of two or more of the plurality of uplinks of the source leaf device;
select one of two or more paths via which to transmit the flowlet to the destination leaf device, wherein selecting the one of the two or more paths includes selecting one of the two or more of the plurality of uplinks of the source leaf device via which to transmit the flowlet, wherein selecting the one of the two or more paths is performed based, at least in part, upon one or more congestion metrics associated with each of the two or more of the plurality of uplinks of the source leaf device, the one or more congestion metrics including the remote congestion metric;

encapsulate the one or more packets with a header, the header including a congestion-experienced field, a load-balancing tag field, a feedback load balancing tag field, and a feedback metric field, the load-balancing tag field being a generic identifier representing all of a plurality of paths for various packets or flowlets originating from a port; and transmit the one or more packets in the flowlet via the selected one of the two or more paths, wherein, the remote congestion metric indicates at least one of: 1) a maximum level of congestion experienced by packet(s) transmitted from the specified one of the plurality of uplinks of the source leaf device to the destination leaf device or 2) a total level of congestion experienced along a path between a corresponding one of the plurality of uplinks of the source leaf device and the destination leaf device, the total level of congestion being a sum of congestion metrics of links along the path between the corresponding one of the plurality of uplinks of the source leaf device and the destination leaf device.

19. The apparatus as recited in claim 18, wherein the congestion experienced field includes a value indicating a maximum level of congestion experienced between the one of the plurality of uplinks of the destination leaf device and the source leaf device.

20. The apparatus as recited in claim 18, wherein the feedback metric indicates a total level of congestion associated with the one of the plurality of uplinks of the source leaf device.

21. The apparatus as recited in claim 18, wherein the header does not contain congestion information for every path between a source and destination devices.

* * * * *